United States Patent
Hu et al.

(10) Patent No.: US 10,827,538 B2
(45) Date of Patent: Nov. 3, 2020

(54) USER EQUIPMENT IDLE STATE PROCESSING METHOD AND DEVICE

(71) Applicant: CHINA ACADEMY OF TELECOMMUNICATIONS TECHNOLOGY, Beijing (CN)

(72) Inventors: Weiqi Hu, Beijing (CN); Zhimi Cheng, Beijing (CN); Hui Xu, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/476,244

(22) PCT Filed: Feb. 7, 2018

(86) PCT No.: PCT/CN2018/075589
§ 371 (c)(1),
(2) Date: Jul. 5, 2019

(87) PCT Pub. No.: WO2018/127231
PCT Pub. Date: Jul. 12, 2018

(65) Prior Publication Data
US 2019/0357276 A1    Nov. 21, 2019

(30) Foreign Application Priority Data

Jan. 9, 2017 (CN) .......................... 2017 1 0013651

(51) Int. Cl.
*H04W 76/10* (2018.01)
*H04W 76/25* (2018.01)

(52) U.S. Cl.
CPC .......... *H04W 76/10* (2018.02); *H04W 76/25* (2018.02)

(58) Field of Classification Search
CPC .... H04W 28/26; H04W 76/10; H04L 65/1069
See application file for complete search history.

(56) References Cited

U.S. PATENT DOCUMENTS

2007/0223450 A1* 9/2007 Holmstrom ........... H04W 28/26
370/352
2014/0029530 A1* 1/2014 Kim ...................... H04W 48/10
370/329

(Continued)

FOREIGN PATENT DOCUMENTS

| CN | 101242645 A | 8/2008 |
| CN | 102348207 A | 2/2012 |

(Continued)

OTHER PUBLICATIONS

Written Opinion of the International Searching Authority for PCT/CN2018/075589 dated Apr. 28, 2018 and its English translation provided by WIPO.

(Continued)

*Primary Examiner* — Joshua L Schwartz
(74) *Attorney, Agent, or Firm* — Ladas & Parry, LLP

(57) ABSTRACT

A UE idle state processing method and a UE idle state processing device are provided. The UE idle state processing method includes: receiving a service request message from a UE forwarded by an RAN; and requesting an SM function body to establish a user plane connection for the UE in accordance with the service request message.

17 Claims, 13 Drawing Sheets

(56) References Cited

U.S. PATENT DOCUMENTS

| | | | |
|---|---|---|---|
| 2016/0227468 A1 | 8/2016 | Kim et al. | |
| 2017/0195926 A1* | 7/2017 | Iwai | H04W 36/12 |
| 2018/0007614 A1* | 1/2018 | Velev | H04W 48/06 |
| 2018/0092154 A1 | 3/2018 | Al | |

FOREIGN PATENT DOCUMENTS

| | | |
|---|---|---|
| CN | 103686845 A | 3/2014 |
| CN | 105813079 A | 7/2016 |
| CN | 106162705 A | 11/2016 |
| WO | 2015142048 A1 | 9/2015 |

OTHER PUBLICATIONS

International Search Report for PCT/CN2018/075589 dated Apr. 28, 2018and its English translation provided by WIPO.

"3rd Generation Partnership Project; Technical Specification Group Services and System Aspects; Study on Architecture for Next Generation System" 3GPP TR 23.799 V14.0.0 (Dec. 2016).

First Office action dated Dec. 26, 2018 and translation for related Chinese Application 2017 10013651.8 (CN 106162705 A) provided by Espacenet.

* cited by examiner

USER EQUIPMENT IDLE STATE PROCESSING METHOD AND DEVICE

CROSS-REFERENCE TO RELATED APPLICATIONS

The present application is the U.S. national phase application of PCT Application No. PCT/CN2018/075589 filed on Feb. 7, 2018, which claims a priority to the Chinese patent application No. 201710013651.8 filed on Jan. 9, 2017, the disclosures of which are incorporated herein by reference in their entireties.

TECHNICAL FIELD

The present disclosure relates to the field of communication technology, in particular to a User Equipment (UE) idle state processing method and a UE idle state processing device.

BACKGROUND

Currently, in an Evolved Packet System (EPS), a Mobility Management Entity (MME) supports a Mobility Management (MM) function, e.g., attachment and Tracking Area (TA) updating, and a Session Management (SM) function, e.g., establishment, modification and deletion of a Public Data Network (PDN) connection, simultaneously. An MM message and an SM message from a UE are terminated at, and processed by, the MME.

In order to improve modularity of a network, in a $5^{th}$-Generation (5G) mobile communication system, the MM function and the SM function exist as two independent functional modules. In addition, a 5G network supports the separation of gateway control from gateway forwarding, and the separation of the MM function from the SM function. Principal functions of an MM function body include user registration, UE-unachievable discovery, position registration, UE state transition, mobility in a connected state and in an inactive state, UE mobility restriction, UE mobility management control, anchor point selection, establishment of user plane path, and etc. Principal functions of an SM function body include forwarding and detection of a data packet, session control, selection of user plane function, allocation of UE Internet Protocol (IP) address (with a connection type of IP connection), and etc. Signaling interaction needs to be performed between the MM function body and the SM function body, so as to achieve information exchange and coordination.

In actual use, when a Radio Access Network (RAN) finds that the UE is in the inactive state, it may change a UE state and trigger the UE to be in an idle state. When the UE or the network needs to perform data transmission, the UE state may also be changed, and the UE may be switched from the idle state to the connected state.

However, there is currently no UE idle state processing method after the MM function is separated from the SM function.

SUMMARY

An object of the present disclosure is to provide a UE idle state processing method and a UE idle state processing device, so as to process a UE idle state in the case that an MM function is separated from an SM function, e.g., to enable a UE to be switched from an idle state into a connected state.

In one aspect, the present disclosure provides in some embodiments a UE idle state processing method for use in an MME function body, including: receiving a service request message from a UE forwarded by an RAN; and requesting an SM function body to establish a user plane connection for the UE in accordance with the service request message.

In a possible embodiment of the present disclosure, the requesting the SM function body to establish the user plane connection for the UE in accordance with the service request message includes: requesting the RAN to establish a connection with the UE and acquire connection information about the connection between the RAN and the UE in accordance with the service request message; and transmitting a user plane connection activation request message to the SM function body, the user plane connection activation request message carrying the connection information about the connection between the RAN and the UE and being adopted to indicate the SM function body to establish the user plane connection for the UE.

In a possible embodiment of the present disclosure, the requesting the RAN to establish the connection with the UE and acquire the connection information about the connection between the RAN the UE in accordance with the service request message includes: transmitting a connection establishment request message to the RAN in accordance with the service request message, the connection establishment request message being adopted to indicate the RAN to establish the connection with the UE; receiving a connection establishment completion message from the RAN; and acquiring the connection information about the connection between the RAN and the UE in accordance with the connection establishment completion message.

In a possible embodiment of the present disclosure, the requesting the SM function body to establish the user plane connection for the UE in accordance with the service request message includes transmitting the user plane connection activation request message to the SM function body in accordance with the service request message, the user plane connection activation request message being adopted to indicate the SM function body to request the RAN to establish the connection with the UE, acquire the connection information about the connection between the RAN and the UE, and establish the user plane connection for the UE.

In a possible embodiment of the present disclosure, the connection with the UE established by the RAN includes a signaling connection, a user plane connection and/or creation of UE context information.

In a possible embodiment of the present disclosure, the service request message is initiated by the UE itself or a network.

In a possible embodiment of the present disclosure, when the service request message is initiated by the network, prior to receiving the service request message from the UE forwarded by the RAN, the UE idle state processing method further includes: receiving a downlink data notification message from the SM function body, wherein when a downlink data message has been received by a core network, the SM function body searches stored UE context information in accordance with a data message identity corresponding to the downlink data message, when relevant session information has been found, transmits the downlink data notification message to the MM function body, otherwise discards the downlink data message, generates and transmits a user plane configuration instruction to an RAN-side UP function body; and upon the receipt of the downlink data notification message, transmitting a paging message to the UE, the paging message being adopted to indicate the UE to initiate a service request.

In a possible embodiment of the present disclosure, the UE idle state processing method further includes: receiving a connection release request message from the RAN; transmitting a user plane connection deactivation request message to the SM function body in accordance with the connection release request message, the user plane connection deactivation request message being adopted to indicate the SM function body to modify a user plane path; receiving a user plane connection deactivation completion message from the SM function body; and upon the receipt of the user plane connection deactivation completion message, transmitting a connection release instruction to the RAN, the connection release instruction being adopted to indicate the RAN to release the connection with the UE.

In a possible embodiment of the present disclosure, the connection release request message or the user plane connection deactivation request message carries at least one of an UE identity, an MM context identity, a base station identity or a release cause.

In a possible embodiment of the present disclosure, the connection with the UE released by the RAN includes a signaling connection, a user plane connection and/or deletion of UE context information.

In another aspect, the present disclosure provides in some embodiments a UE idle state processing method for use in an SM function body, including: receiving a user plane connection activation request message from an MM function body; acquiring connection information about a connection between the RAN and the UE in accordance with the user plane connection activation request message; and establishing a user plane connection for the UE in accordance with the connection information about the connection between the RAN and the UE and SM-related information.

In a possible embodiment of the present disclosure, the user plane connection activation request message is transmitted after the MM function body has requested the RAN to establish the connection with the UE in accordance with a service request message received from the UE and forwarded by the RAN, and carries the connection information about the connection between the RAN and the UE.

In a possible embodiment of the present disclosure, the acquiring the connection information about the connection between the RAN and the UE in accordance with the user plane connection activation request message includes: transmitting a connection establishment request message to the RAN in accordance with the user plane connection activation request message, the connection establishment request message being adopted to indicate the RAN to establish the connection with the UE; receiving a connection establishment completion message from the RAN; and acquiring the connection information about the connection between the RAN and the UE in accordance with the connection establishment completion message.

In a possible embodiment of the present disclosure, the establishing the user plane connection for the UE in accordance with the connection information about the connection between the RAN and the UE and the SM-related information includes: determining a user plane path for the UE as unchanged in accordance with the connection information about the connection between the RAN and the UE and the SM-related information; after the user plane path for the UE has been determined as unchanged, generating and transmitting a user plane configuration instruction to an RAN-side UP function body on the user plane path, the user plane configuration instruction being adopted to indicate the RAN-side UP function body to modify a downlink user plane path; and receiving a user plane modification completion message from the RAN-side UP function body.

In a possible embodiment of the present disclosure, subsequent to receiving the user plane modification completion message from the RAN-side UP function body, the UE idle state processing method further includes transmitting a user plane connection completion message to the MM function body.

In a possible embodiment of the present disclosure, the establishing the user plane connection for the UE in accordance with the connection information about the connection between the RAN and the UE and the SM-related information includes: determining that a new user plane path is reselected for the UE in accordance with the connection information about the connection between the RAN and the UE and the SM-related information; generating and transmitting the user plane configuration instruction to a new RAN-side UP function body on the new user plane path, the user plane configuration instruction being adopted to indicate the new RAN-side UP function body to establish a routing or forwarding rule; transmitting a user plane modification request message to an original RAN-side UP function body on an original user plane path for the UE, the user plane modification request message being adopted to indicate the original RAN-side UP function body to modify the user plane path; and receiving a user plane establishment completion message from the new RAN-side UP function body, and receiving a user plane modification completion message from the original RAN-side UP function body.

In a possible embodiment of the present disclosure, the establishing the user plane connection for the UE in accordance with the connection information about the connection between the RAN and the UE and the SM-related information includes: determining that a new user plane path is reselected for the UE in accordance with the connection information about the connection between the RAN and the UE and the SM-related information; generating and transmitting a user plane configuration instruction to a new UP function body and a DN-side UP function body on the new user plane path, the user plane configuration instruction being adopted to indicate the new UP function body to establish a routing or forwarding rule, and indicate the DN-side UP function body to modify the user plane path and forward a data message transmitted to the UE to the new UP function body; and receiving a user plane establishment completion message from the new UP function body, and receiving a user plane modification completion message from the DN-side UP function body.

In a possible embodiment of the present disclosure, subsequent to receiving the user plane establishment completion message from the new UP function body and receiving the user plane modification completion message from the DN-side UP function body, the UE idle state processing method further includes: generating and transmitting a user plane deletion instruction to an original UP function body on an original user plane path for the UE, the user plane deletion instruction being adopted to indicate the original UP function body to release the user plane connection for the UE; and receiving a user plane deletion completion message from the original UP function body.

In a possible embodiment of the present disclosure, subsequent to receiving the user plane establishment completion message from the new UP function body and receiving the user plane modification completion message from the DN-side UP function body, the UE idle state processing method further includes: generating and transmitting a user plane configuration instruction to an original UP function body on an original user plane path for the UE, the user plane configuration instruction being adopted to indicate the original UP function body to establish the user plane path, and forward a received data message to the DN-side UP function body; and receiving a user plane modification completion message from the original UP function body.

In a possible embodiment of the present disclosure, subsequent to receiving the user plane modification completion message from the original UP function body, the UE idle state processing method further includes: initiating a timer, the timer being configured to determine a life cycle of the user plane path established by the original UP function body; when the timer is expired, generating and transmitting a user plane deletion instruction to the original UP function body, the user plane deletion instruction being adopted to indicate the original UP function body to release the user plane connection for the UE; and receiving a user plane deletion completion message from the original UP function body.

In a possible embodiment of the present disclosure, the UE idle state processing method further includes: receiving a user plane connection deactivation request message from the MM function body; generating and transmitting a user plane configuration instruction to an RAN-side UP function body in accordance with the user plane connection deactivation request message, the user plane configuration instruction being adopted to indicate the RAN-side UP function body to modify a downlink user plane path; receiving a user plane modification completion message from the RAN-side UP function body; and transmitting a user plane connection deactivation completion message to the MM function body in accordance with the user plane modification completion message.

In a possible embodiment of the present disclosure, the user plane connection deactivation request message carries at least one of a UE identity, an MM context identity, a base station identity or a release cause.

In a possible embodiment of the present disclosure, the connection with the UE released by the RAN includes a signaling connection, a user plane connection and/or deletion of UE context information.

In yet another aspect, the present disclosure provides in some embodiments a UE idle state processing device for use in an MM function body, including: a fifth reception module configured to receive a service request message from a UE forwarded by an RAN; and a requesting module configured to request an SM function body to establish a user plane connection for the UE in accordance with the service request message.

In a possible embodiment of the present disclosure, the requesting module includes: a requesting unit configured to request the RAN to establish a connection with the UE and acquire connection information about the connection between the RAN and the UE in accordance with the service request message; and a first transmission unit configured to transmit a user plane connection activation request message to the SM function body, the user plane connection activation request message carrying the connection information about the connection between the RAN and the UE and being adopted to indicate the SM function body to establish the user plane connection for the UE.

In a possible embodiment of the present disclosure, the requesting unit includes: a transmission sub-unit configured to transmit a connection establishment request message to the RAN in accordance with the service request message, the connection establishment request message being adopted to indicate the RAN to establish the connection with the UE; a reception sub-unit configured to receive a connection establishment completion message from the RAN; and an acquisition sub-unit configured to acquire the connection information about the connection between the RAN and the UE in accordance with the connection establishment completion message.

In a possible embodiment of the present disclosure, the requesting module includes a second transmission unit configured to transmit the user plane connection activation request message to the SM function body in accordance with the service request message, the user plane connection activation request message being adopted to indicate the SM function body to request the RAN to establish the connection with the UE, acquire the connection information about the connection between the RAN and the UE, and establish the user plane connection for the UE.

In a possible embodiment of the present disclosure, the connection with the UE established by the RAN includes a signaling connection, a user plane connection and/or creation of UE context information.

In a possible embodiment of the present disclosure, the service request message is initiated by the UE itself or a network.

In a possible embodiment of the present disclosure, when the service request message is initiated by the network, the UE idle state processing device further includes: a sixth reception module configured to receive a downlink data notification message from the SM function body, wherein when a downlink data message has been received by a core network, the SM function body searches stored UE context information in accordance with a data message identity corresponding to the downlink data message, when relevant session information has been found, transmits the downlink data notification message to the MM function body, otherwise discards the downlink data message, generates and transmits a user plane configuration instruction to an RAN-side UP function body; and a fifth transmission module configured to, upon the receipt of the downlink data notification message, transmit a paging message to the UE, the paging message being adopted to indicate the UE to initiate a service request.

In a possible embodiment of the present disclosure, the UE idle state processing device further includes: a first reception module configured to receive a connection release request message from the RAN; a first transmission module configured to transmit a user plane connection deactivation request message to the SM function body in accordance with the connection release request message, the user plane connection deactivation request message being adopted to indicate the SM function body to modify a user plane path; a second reception module configured to receive a user plane connection deactivation completion message from the SM function body; and a second transmission module configured to, upon the receipt of the user plane connection deactivation completion message, transmit a connection release instruction to the RAN, the connection release instruction being adopted to indicate the RAN to release the connection with the UE.

In a possible embodiment of the present disclosure, the connection release request message or the user plane connection deactivation request message carries at least one of an UE identity, an MM context identity, a base station identity or a release cause.

In a possible embodiment of the present disclosure, the connection with the UE released by the RAN includes a signaling connection, a user plane connection and/or deletion of UE context information.

In still yet another aspect, the present disclosure provides in some embodiments a UE idle state processing device for use in an SM function body, including: a seventh reception module configured to receive a user plane connection activation request message from an MM function body; an acquisition module configured to acquire connection information about a connection between the RAN and the UE in accordance with the user plane connection activation request message; and an establishment module configured to establish a user plane connection for the UE in accordance with the connection information about the connection between the RAN and the UE and SM-related information.

In a possible embodiment of the present disclosure, the user plane connection activation request message is transmitted after the MM function body has requested the RAN to establish the connection with the UE in accordance with a service request message received from the UE and forwarded by the RAN, and carries the connection information about the connection between the RAN and the UE.

In a possible embodiment of the present disclosure, the acquisition module includes: a third transmission unit configured to transmit a connection establishment request message to the RAN in accordance with the user plane connection activation request message, the connection establishment request message being adopted to indicate the RAN to establish the connection with the UE; a first reception unit configured to receive a connection establishment completion message from the RAN; and an acquisition unit configured to acquire the connection information about the connection between the RAN and the UE in accordance with the connection establishment completion message.

In a possible embodiment of the present disclosure, the establishment module includes: a first determination unit configured to determine a user plane path for the UE as unchanged in accordance with the connection information about the connection between the RAN and the UE and the SM-related information; a fourth transmission unit configured to, after the user plane path for the UE has been determined as unchanged, generate and transmit a user plane configuration instruction to an RAN-side UP function body on the user plane path, the user plane configuration instruction being adopted to indicate the RAN-side UP function body to modify a downlink user plane path; and a second reception unit configured to receive a user plane modification completion message from the RAN-side UP function body.

In a possible embodiment of the present disclosure, the UE idle state processing device further includes a sixth transmission module configured to transmit a user plane connection completion message to the MM function body.

In a possible embodiment of the present disclosure, the establishment module includes: a second determination unit configured to determine that a new user plane path is reselected for the UE in accordance with the connection information about the connection between the RAN and the UE and the SM-related information; a fifth transmission unit configured to generate and transmit the user plane configuration instruction to a new RAN-side UP function body on the new user plane path, the user plane configuration instruction being adopted to indicate the new RAN-side UP function body to establish a routing or forwarding rule; a sixth transmission unit configured to transmit a user plane modification request message to an original RAN-side UP function body on an original user plane path for the UE, the user plane modification request message being adopted to indicate the original RAN-side UP function body to modify the user plane path; and a third reception unit configured to receive a user plane establishment completion message from the new RAN-side UP function body, and receiving a user plane modification completion message from the original RAN-side UP function body.

In a possible embodiment of the present disclosure, the establishment module includes: a third determination unit configured to determine that a new user plane path is reselected for the UE in accordance with the connection information about the connection between the RAN and the UE and the SM-related information; a seventh transmission unit configured to generate and transmit a user plane configuration instruction to a new UP function body and a DN-side UP function body on the new user plane path, the user plane configuration instruction being adopted to indicate the new UP function body to establish a routing or forwarding rule, and indicate the DN-side UP function body to modify the user plane path and forward a data message transmitted to the UE to the new UP function body; and a fourth reception unit configured to receive a user plane establishment completion message from the new UP function body, and receiving a user plane modification completion message from the DN-side UP function body.

In a possible embodiment of the present disclosure, the UE idle state processing device further includes: a seventh transmission module configured to generate and transmit a user plane deletion instruction to an original UP function body on an original user plane path for the UE, the user plane deletion instruction being adopted to indicate the original UP function body to release the user plane connection for the UE; and an eighth reception module configured to receive a user plane deletion completion message from the original UP function body.

In a possible embodiment of the present disclosure, the UE idle state processing device further includes: an eighth transmission module configured to generate and transmit a user plane configuration instruction to an original UP function body on an original user plane path for the UE, the user plane configuration instruction being adopted to indicate the original UP function body to establish the user plane path, and forward a received data message to the DN-side UP function body; and a ninth reception module configured to receive a user plane modification completion message from the original UP function body.

In a possible embodiment of the present disclosure, the UE idle state processing device further includes: an initiation module configured to initiate a timer, the timer being configured to determine a life cycle of the user plane path established by the original UP function body; a ninth transmission module configured to, when the timer is expired, generate and transmit a user plane deletion instruction to the original UP function body, the user plane deletion instruction being adopted to indicate the original UP function body to release the user plane connection for the UE; and a tenth reception module configured to receive a user plane deletion completion message from the original UP function body.

In a possible embodiment of the present disclosure, the UE idle state processing device further includes: a third reception module configured to receive a user plane connection deactivation request message from the MM function body; a third transmission module configured to generate and transmit a user plane configuration instruction to an RAN-side UP function body in accordance with the user plane connection deactivation request message, the user plane configuration instruction being adopted to indicate the RAN-side UP function body to modify a downlink user plane path; a fourth reception module configured to receive a user plane modification completion message from the RAN-side UP function body; and a fourth transmission module configured to transmit a user plane connection deactivation completion message to the MM function body in accordance with the user plane modification completion message.

In a possible embodiment of the present disclosure, the user plane connection deactivation request message carries at least one of a UE identity, an MM context identity, a base station identity or a release cause.

In a possible embodiment of the present disclosure, the connection with the UE released by the RAN includes a signaling connection, a user plane connection and/or deletion of UE context information.

In still yet another aspect, the present disclosure provides in some embodiments a UE idle state processing device for use in an MM function body, including a processor, a memory, and a computer program stored in the memory and executed by the processor. The computer program is executed by the processor, so as to implement the above-mentioned UE idle state processing method for use in the MM function body.

In still yet another aspect, the present disclosure provides in some embodiments a UE idle state processing device for use in an SM function body, including a processor, a memory, and a computer program stored in the memory and executed by the processor. The computer program is executed by the processor, so as to implement the above-mentioned UE idle state processing method for use in the SM function body.

In still yet another aspect, the present disclosure provides in some embodiments a computer-readable storage medium storing therein a computer program. The computer program is executed by a processor so as to implement the above-mentioned UE idle state processing method for use in the MM function body.

In still yet another aspect, the present disclosure provides in some embodiments a computer-readable storage medium storing therein a computer program. The computer program is executed by a processor so as to implement the above-mentioned UE idle state processing method for use in the SM function body.

According to the UE idle state processing method in the embodiments of the present disclosure, in the case that an MM function is separated from an SM function, the UE may enter in an idle state through the signaling interaction between the MM function body and the SM function body. When the UE has entered in the idle state, the connection between the RNA and the UE may be released, and the user plane connection in the core network may be maintained, so as to facilitate the rapid response to the service. In addition, the user plane connection may be established for the UE, so as to enable the UE to be switched from the idle state to a connected state, thereby to reduce signaling overhead between a control plane and a user plane, and shorten a time delay for entering the connected state.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

FIGS. 7A to 7J are flow charts of procedures of enabling the UE to be switched from the idle state to a connected state according to the fourth embodiment of the present disclosure;

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

First Embodiment

Figure 1:
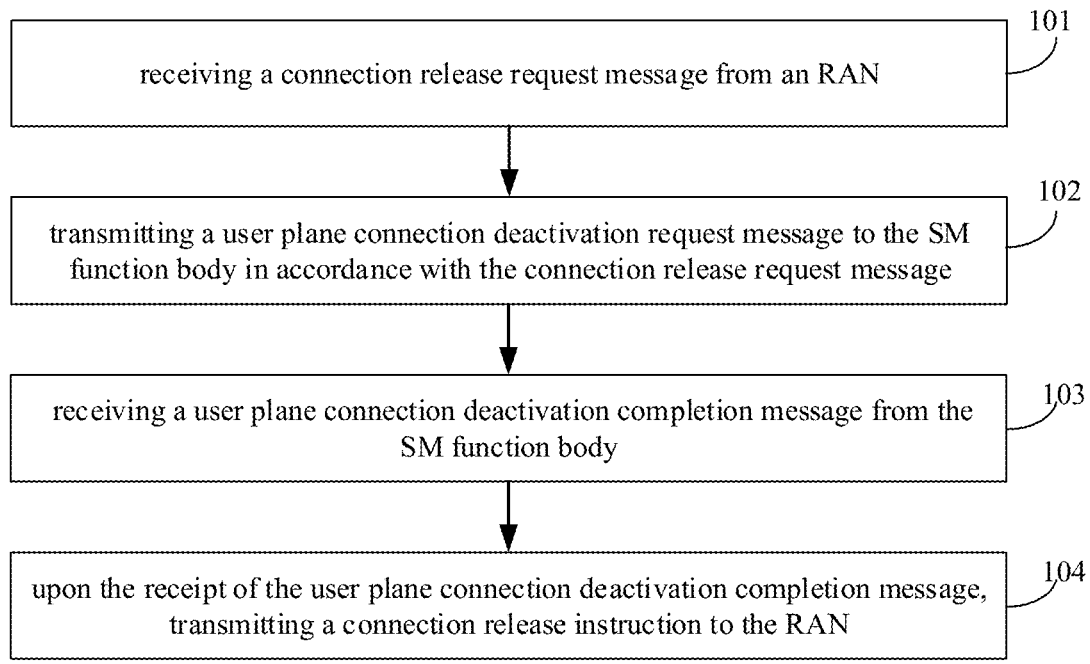
FIG. 1 is a flow chart of a UE idle state processing method according to a first embodiment of the present disclosure.

The present disclosure provides in this embodiment a UE idle state processing method for use in an MM function body. As shown in FIG. 1, the UE idle state processing method includes the following Steps 101 to 104.

Step 101: receiving a connection release request message from an RAN.

In this embodiment, when the RAN finds that it is necessary to release a signaling connection and a user plane connection for a UE, it may transmit the connection release request message to the MM function body, so as to enable the MM function body to request an SM function body to modify a user plane path for the UE, thereby to enable the UE to be in an idle state.

The connection release request message may carry at least one of a UE identity, an MM context identity, a base station identity, a release cause (e.g., user inactivity, i.e., the initiation of the connection release for saving resources when long-term data traffic is smaller than a certain threshold), and etc.

Step 102: transmitting a user plane connection deactivation request message to the SM function body in accordance with the connection release request message.

In this embodiment, the user plane connection deactivation request message may be adopted to indicate the SM function body to modify the user plane path, and it may carry at least one of the UE identity, the MM context identity, the base station identity, the release cause (e.g., user inactivity), and etc. In addition, the user plane connection deactivation request message may also include a session modification request message.

Upon the receipt of the user plane connection deactivation request message, the SM function body may generate and transmit a user plane configuration instruction to an RAN-side UP function body, so that the RAN-side UP function body may modify a downlink user plane path in accordance with the user plane configuration instruction. The user plane configuration instruction may be, e.g., adopted to indicate the RAN-side UP function body to report a received downlink data message to the SM function body.

The RAN-side UP function body may be a user plane in a core network and connected to the RAN.

Step 103: receiving a user plane connection deactivation completion message from the SM function body.

In this embodiment, after the modification of the user plane path, the SM function body may transmit the user plane connection deactivation completion message to the MM function body.

Step 104: upon the receipt of the user plane connection deactivation completion message, transmitting a connection release instruction to the RAN.

In this embodiment, the connection release instruction may be adopted to indicate the RAN to release a connection with the UE. Upon the receipt of the connection release instruction, the RAN may release the connection with the UE. To be specific, the connection with the UE released by the RAN may include a signaling connection, a user plane connection and/or deletion of UE context information.

After releasing the connection with the UE, the RAN may notify the UE, and transmit the connection release completion message to the MM function body. In this way, the network may consider that the UE is in an idle state.

A procedure of triggering, by the RAN, the UE to be in the idle state in the first embodiment will be described hereinafter in conjunction with FIG. 2.

Figure 2:
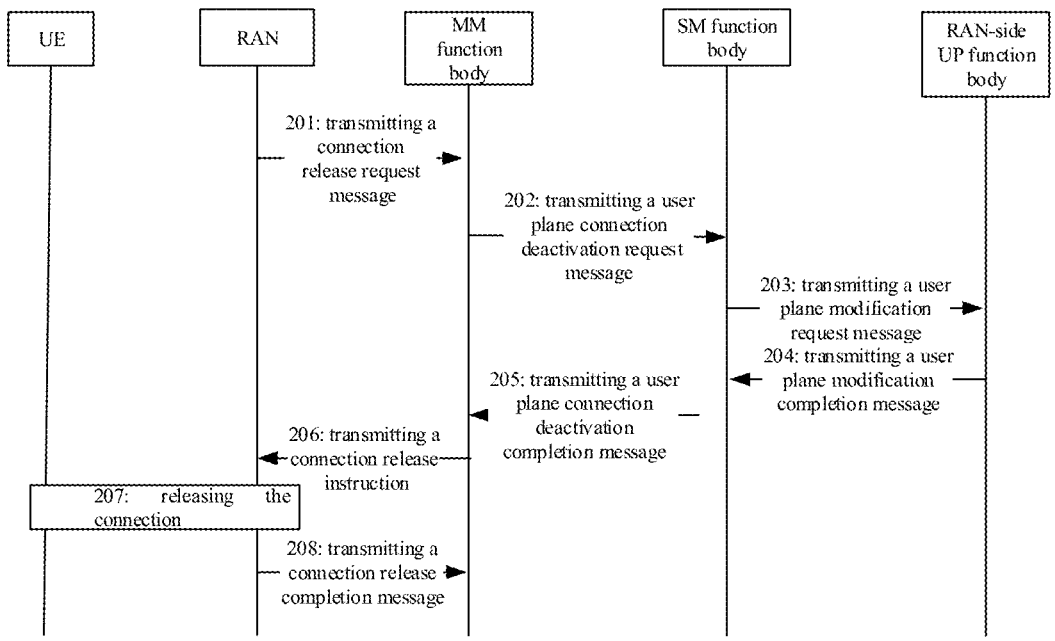
FIG. 2 is a flow chart of a procedure for an RAN to trigger a UE to be in an idle state according to the first embodiment of the present disclosure.

As shown in FIG. 2, the procedure of triggering, by the RAN, the UE to be in the idle state may include: Step 201 of, when it is found that it is necessary to release the signaling connection and the user plane connection for the UE, transmitting, by the RAN, the connection release request message to the MM function body; Step 202 of, upon the receipt of the connection release request message, transmitting, by the MM function body, the user plane connection deactivation request message to the SM function body; Step 203 of transmitting, by the SM function body, the user plane modification request message to the RAN-side UP function body in accordance with the user plane connection deactivation request message, the user plane modification request message carrying the user plane configuration instruction generated by the SM function body; Step 204 of modifying, by the RAN-side UP function body, the downlink user plane path in accordance with the user plane configuration instruction, and transmitting the user plane modification completion message to the SM function body after the modification; Step 205 of, upon the receipt of the user plane modification completion message, transmitting, by the SM function body, the user plane connection deactivation completion message to the MM function body; Step 206 of, upon the receipt of the user plane connection deactivation completion message, transmitting, by the MM function body, the connection release instruction to the RAN; Step 207 of releasing, by the RAN, the connection with the UE in accordance with the connection release instruction, the connection with the UE released by the RAN including a signaling connection, a user plane connection and/or creation of UE context information; and Step 208 of, after the connection with the UE has been released, transmitting, by the RAN, the connection release completion message to the MM function body. At this time, the network may consider that the UE is in the idle state.

According to the UE idle state processing method in the first embodiment of the present disclosure, in the case that an MM function is separated from an SM function, through the signaling interaction between the MM function body and the SM function body, the UE may be in the idle state. In addition, when the UE is in the idle state, the connection between the RAN and the UE may be released, and the user plane connection in the core network may be maintained. As a result, it is able to facilitate the rapid response to services.

Second Embodiment

Figure 3:
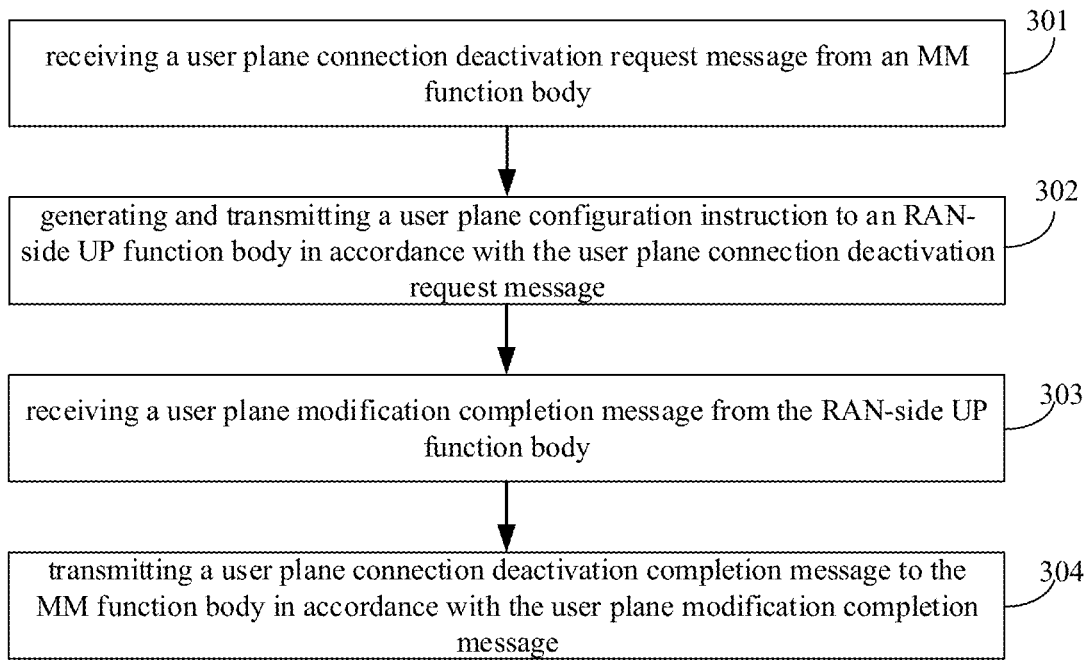
FIG. 3 is a flow chart of a UE idle state processing method according to a second embodiment of the present disclosure.

The present disclosure further provides in this embodiment a UE idle state processing method for use in an SM function body. As shown in FIG. 3, the UE idle state processing method may include the following Steps 301 to 304.

Step 301: receiving a user plane connection deactivation request message from an MM function body.

In this embodiment, when the RAN finds that it is necessary to release a signaling connection and a user plane connection for the UE, it may transmit a connection release request message to the MM function body, so that the MM function body may request the SM function body to modify a user plane path for the UE, and transmit the user plane connection deactivation request message to the SM function body.

The user plane connection deactivation request message may be adopted to indicate the SM function body to modify the user plane path, and it may carry at least one of a UE identity, an MM context identity, a base station identity, a release cause (e.g., user inactivity), and etc. The user plane connection deactivation request message may also include a session modification request message.

Step 302: generating and transmitting a user plane configuration instruction to an RAN-side UP function body in accordance with the user plane connection deactivation request message.

In this embodiment, the user plane configuration instruction may be adopted to indicate the RAN-side UP function body to modify a downlink user plane path. For example, the user plane configuration instruction may indicate the RAN-side UP function body to report a received downlink data message to the SM function body.

Step 303: receiving a user plane modification completion message from the RAN-side UP function body.

In this embodiment, after the modification of the user plane path, the RAN-side UP function body may transmit the user plane modification completion message to the SM function body.

Step 304: transmitting a user plane connection deactivation completion message to the MM function body in accordance with the user plane modification completion message.

In this embodiment, upon the receipt of the user plane connection deactivation completion message, the MM function body may transmit a connection release request message to the RAN, so as to indicate the RAN to release the connection with the UE. To be specific, the connection with the UE released by the RAN may include a signaling connection, a user plane connection and/or deletion of UE context information.

According to the UE idle state processing method in the second embodiment of the present disclosure, in the case that an MM function is separated from an SM function, through the signaling interaction between the MM function body and the SM function body, the UE may be in the idle state. In addition, when the UE is in the idle state, the connection between the RAN and the UE may be released, and the user plane connection in the core network may be maintained. As a result, it is able to facilitate the rapid response to services.

Third Embodiment

Figure 4:
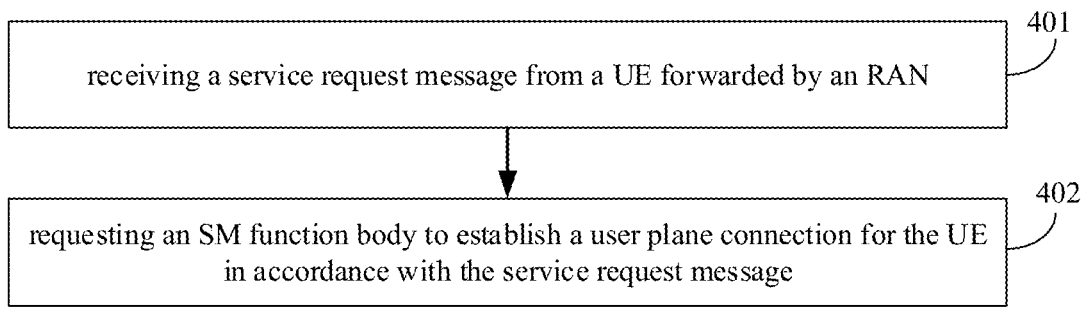
FIG. 4 is a flow chart of a UE idle state processing method according to a third embodiment of the present disclosure.

The present disclosure further provides in this embodiment a UE idle state processing method for use in an MM function body. As shown in FIG. 4, the UE idle state processing method may include the following Steps 401 and 402.

Step 401: receiving a service request message from a UE forwarded by an RAN.

In this embodiment, the service request message may carry at least one of a UE identity, an MM context identity, a base station identity, and etc.

The service request message may be initiated by the UE itself or by a network. When there is a service for the UE, the UE may transmit the service request message to the RAN, and then the RAN may forward the service request message to the MM function body. The UE may transit the service request message after it has received a paging message from a network side.

To be specific, when the service request message is initiated by the network, prior to Step 401, the UE idle state processing method may further include: receiving a downlink data notification message from the SM function body; and upon the receipt of the downlink data notification message, transmitting a paging message to the UE.

When a downlink data message has been received by a core network, the SM function body may search stored UE context information in accordance with a data message identity corresponding to the downlink data message. When relevant session information has been searched, the SM function body may transmit the downlink data notification message to the MM function body. Otherwise, the SM function body may discard the downlink data message, generate and transmit a user plane configuration instruction to an RAN-side UP function body, so as to complete the configuration of a routing or forwarding rule (i.e., discard the downlink data message). The paging message may be adopted to indicate the UE to initiate a service request, i.e., transmit the service request message to the MM function body.

Step 402: requesting the SM function body to establish a user plane connection for the UE in accordance with the service request message.

In this embodiment, the MM function body may request the SM function body to establish the user plane connection for the UE in accordance with the service request message in at least two modes described hereinafter.

Mode 1: the MM function body may process a connection request.

In Mode 1, the MM function body may request the SM function body to establish the user plane connection for the UE in accordance with the service request message as follows.

At first, the MM function body may request the RAN to establish a connection with the UE and acquire connection information about the connection between the RAN and the UE in accordance with the service request message. Next, the MM function body may transmit a user plane connection activation request message to the SM function body. The user plane connection activation request message may carry the connection information about the connection between the RAN and the UE, and it may be adopted to indicate the SM function body to establish the user plane connection for the UE.

The MM function body may request the RAN to establish the connection with the UE and acquire the connection information about the connection between the RAN and the UE in accordance with the service request message as follows.

At first, the MM function body may transmit a connection establishment request message to the RAN in accordance with the service request message, and the connection establishment request message may be adopted to indicate the RAN to establish the connection with the UE. Next, the MM function body may receive a connection establishment completion message from the RAN. Finally, the MM function body may acquire the connection information about the connection between the RAN and the UE in accordance with the connection establishment completion message.

Mode 2: the SM function body may process the connection request.

In Mode 2, the MM function body may request the SM function body to establish the user plane connection for the UE in accordance with the service request message as follows.

The MM function body may directly transmit the user plane connection activation request message to the SM function body in accordance with the service request message, the user plane connection activation request message may be adopted to indicate the SM function body to request the RAN to establish the connection with the UE, acquire the connection information about the connection between the RAN and the UE, and establish the user plane connection for the UE.

In this embodiment, the connection with the UE established by the RAN may include a signaling connection, a user plane connection and/or creation of UE context information.

In this embodiment, the UE idle state processing method may further include: receiving a connection release request message from the RAN; transmitting a user plane connection deactivation request message to the SM function body in accordance with the connection release request message, the user plane connection deactivation request message being adopted to indicate the SM function body to modify a user plane path; receiving a user plane connection deactivation completion message from the SM function body; and upon the receipt of the user plane connection deactivation completion message, transmitting a connection release instruction to the RAN, the connection release instruction being adopted to indicate the RAN to release the connection with the UE (which may refer to that mentioned in the first embodiment).

The connection release request message or the user plane connection deactivation request message may carry at least one of a UE identity, an MM context identity, a base station identity and a release cause.

The connection with the UE released by the RAN may include a signaling connection, a user plane connection and/or deletion of UE context information.

Two procedures of initiating, by the network, the service request in the third embodiment will be described hereinafter in conjunction with FIGS. 5A and 5B.

Figure 5A:
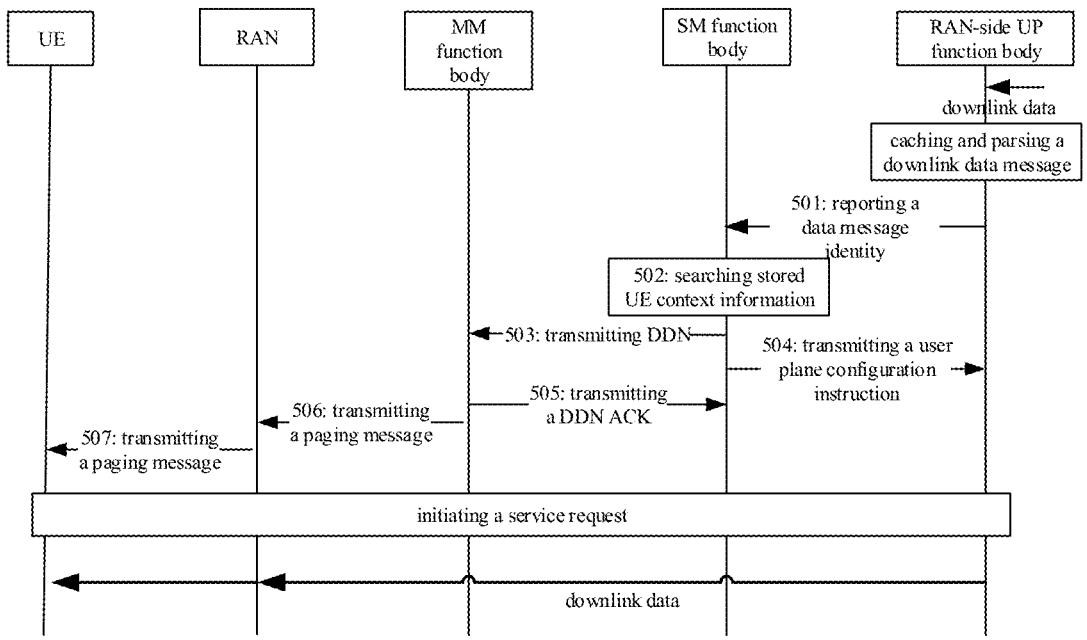
FIGS. 5A and 5B are flow charts of two procedures of initiating a service request by a network according to the third embodiment of the present disclosure.

As shown in FIG. 5A, the procedure of initiating, by the network, the service request may include the following steps.

Step 501: reporting, by the RAN-side UP function body, a data message identity to the SM function body. Because there is no downlink user plane path, upon the receipt of a downlink data message, the core network, i.e., the RAN-side UP function body, may cache the downlink data message, parse the downlink data message to acquire the data message identity, and report the data message identity to the SM function body.

Step 502: searching, by the SM function body, the stored UE context information in accordance with the data message identity, when relevant session information has been searched, proceeding to Step 503, and otherwise proceeding to Step 504.

Step 503: transmitting, by the SM function body, downlink data notification message DDN to the MM function body.

Step 504: determining, by the SM function body, that the downlink data message is to be discarded, generating and transmitting the user plane configuration instruction to the RAN-side UP function body, so as to configure the routing or forwarding rule (i.e., discharge the downlink data message).

Step 505: upon the receipt of the DDN, transmitting, by the MM function body, a DDN Acknowledgement (ACK) to the SM function body.

Step 506: transmitting, by the MM function body, the paging message to the RAN.

Step 507: transmitting, by the RAN, the paging message to the UE, so as to enable the UE to initiate the service request.

Figure 5B:
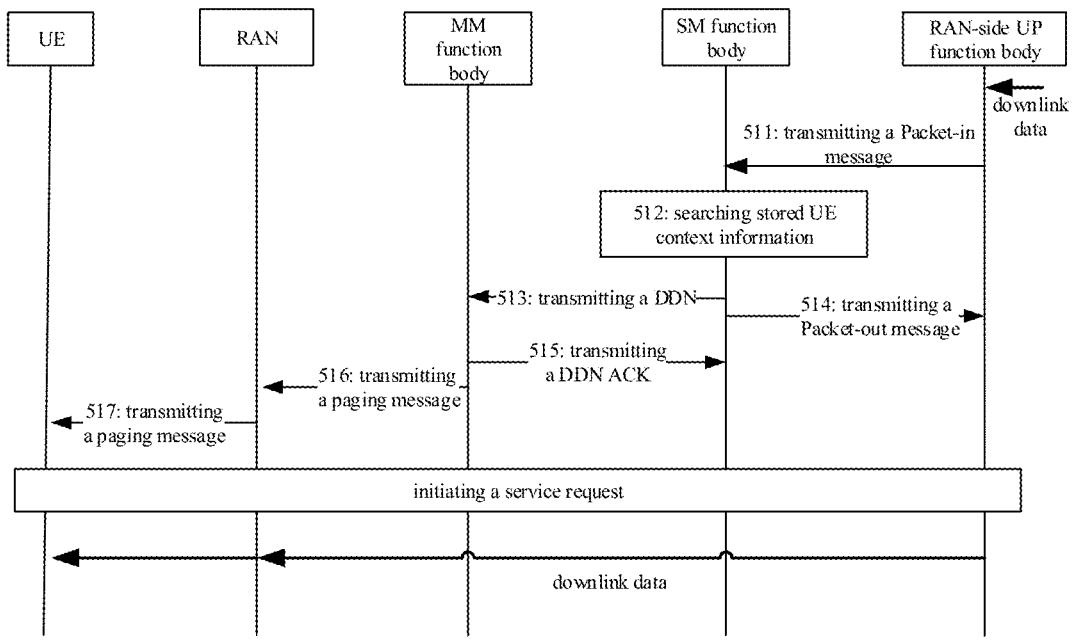

As shown in FIG. 5B, the procedure of initiating, by the network (a Software Defined Network (SDN) which adopts an OpenFlow protocol), the service request may include the following steps.

Step 511: transmitting, by the RAN-side UP function body, a Packet-in message to the SM function body. Because there is no downlink user plane path, upon the receipt of a downlink data message, the core network, i.e., the RAN-side UP function body, may cache the downlink data message, and transmit the Packet-in message, with the entire downlink data message as an attached content, to the SM function body.

Step 512: searching, by the SM function body, the stored UE context information in accordance with the Packet-in message, when relevant session information has been found, proceeding to Step 513, and otherwise proceeding to Step 514.

Step 513: transmitting, by the SM function body, the DDN to the MM function body.

Step 514: determining, by the SM function body, that the downlink data message is to be discarded, generating a corresponding flow table entry, and transmitting a Packet-out message to the RAN-side UP function body, so as to configure the flow table entry (i.e., discard the downlink data message).

Step 515: upon the receipt of the DDN, transmitting, by the MM function body, the DDN ACK to the SM function body.

Step 516: transmitting, by the MM function body, the paging message to the RAN.

Step 517: transmitting, by the RAN, the paging message to the UE, so as to enable the UE to initiate the service request.

According to the UE idle state processing method in the third embodiment of the present disclosure, in the case that an MM function is separated from an SM function, through the signaling interaction between the MM function body and the SM function body, the user plane connection may be established for the UE, so as to enable the UE to be switched from the idle state to the connected state. As a result, it is able to reduce the signaling overhead between the control plane and the user plane, thereby to shorten a time delay for the UE to be in the connected state.

Fourth Embodiment

Figure 6:
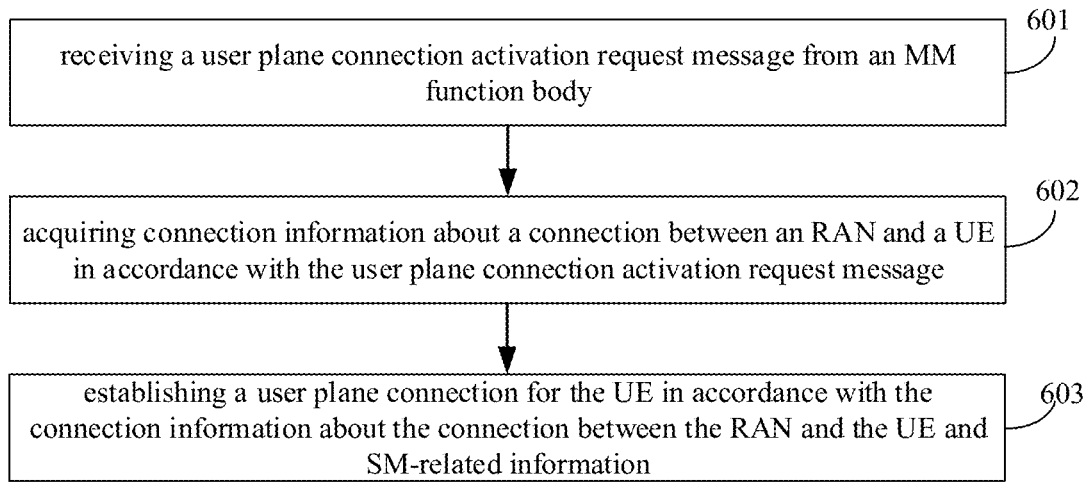
FIG. 6 is a flow chart of a UE idle state processing method according to a fourth embodiment of the present disclosure.

The present disclosure further provides in this embodiment a UE idle state processing method for use in an SM function body. As shown in FIG. 6, the UE idle state processing method may include the following Steps 601 to 603.

Step 601: receiving a user plane connection activation request message from an MM function body.

In this embodiment, upon the receipt of a service request message from a UE forwarded by an RAN, the MM function body may directly transmit the user plane connection activation request message to the SM function body in accordance with the service request message, so as to indicate the SM function body to request the RAN to establish a connection with the UE. In addition, the MM function body may also transmit the user plane connection activation request message to the SM function body after requesting the RAN to establish the connection with the UE in accordance with the received service request message from the UE forwarded by the RAN.

The service request message or the user plane connection activation request message may carry at least one of a UE identity, an MM context identity and a base station identity.

Step 602: acquiring connection information about the connection between the RAN and the UE in accordance with the user plane connection activation request message.

In this embodiment, the establishment of the connection between the RAN and the UE may be requested by the MM function body or the SM function body.

When the connection between the RAN and the UE is requested by the MM function body to be established, the user plane connection activation request message in Step 602 may be transmitted after the MM function body has requested the RAN to establish the connection with the UE in accordance with the service request message received from the UE and forwarded by the RAN, and carry the connection information about the connection between the RAN and the UE.

When the connection between the RAN and the UE is requested by the SM function body to be established, Step 602 may include: transmitting a connection establishment request message to the RAN in accordance with the user plane connection activation request message, the connection establishment request message being adopted to indicate the RAN to establish the connection with the UE; receiving a connection establishment completion message from the RAN; and acquiring the connection information about the connection between the RAN and the UE in accordance with the connection establishment completion message.

The connection with the UE established by the RAN may include a signaling connection, a user plane connection and/or creation of UE context information.

Step 603: establishing a user plane connection for the UE in accordance with the connection information about the connection between the RAN and the UE and SM-related information.

In this embodiment, the SM function body may establish the user plane connection for the UE in accordance with the connection information about the connection between the RAN and the UE and the SM-related information, as well as any other auxiliary information, e.g., service requirement, node load, link congestion level (one or a combination of these factors). The SM-related information may at least include information about a current position of the UE.

To be specific, the SM function body may establish the user plane connection for the UE in at least the following four circumstances.

In a first circumstance, a user plane path for the UE remains unchanged.

In the first circumstance, a procedure of establishing, by the SM function body, the user plane connection for the UE will be described as follows.

At first, the SM function body may determine the user plane path for the UE as unchanged in accordance with the connection information about the connection between the RAN and the UE and the SM-related information (which may include the position about the current position of the UE).

Next, after determining that the user plane path for the UE remains unchanged, the SM function body may generate and transmit a user plane configuration instruction to an RAN-side UP function body on the user plane path. The user plane configuration instruction may be adopted to indicate the RAN-side UP function body to modify a downlink user plane path, i.e., transmit a downlink data message in accordance with a routing or forwarding rule upon the receipt of the downlink data message.

Finally, the SM function body may receive a user plane modification completion message from the RAN-side UP function body.

The RAN-side UP function body may be specifically a user plane in the core network connected to the RAN. In the first circumstance, the service request may be initiated by the UE itself, or by the network.

In the embodiment of the present disclosure, upon the receipt of the user plane modification completion message from the RAN-side UP function body, the SM function body may transmit a user plane connection completion message to the MM function body, so as to complete the establishment of the user plane connection for the UE.

In a second circumstance, the user plane path for the UE is changed.

In the second circumstance, the procedure of establishing, by the SM function body, the user plane connection for the UE will be described as follows.

At first, the SM function body may determine that a new user plane path is to be reselected for the UE in accordance with the connection information about the connection between the RAN and the UE and the SM-related information (which may include the position about the current position of the UE).

Next, the SM function body may generate and transmit the user plane configuration instruction to a new RAN-side UP function body on the new user plane path. The user plane configuration instruction may be adopted to indicate the new RAN-side UP function body to establish a routing or forwarding rule, i.e., route or forward a received uplink data message to be transmitted to the UE to an original RAN-side UP function body (an uplink routing or forwarding rule). In addition, the SM function body may transit a user plane modification request message to the original RAN-side UP function body on an original user plane path for the UE. The user plane modification request message may be adopted to indicate the original RAN-side UP function body to modify the user plane path, i.e., route or forward the received downlink data message to be transmitted to the UE to the new RAN-side UP function body (a downlink routing or forwarding rule).

Finally, the SM function body may receive a user plane establishment completion message form the new RAN-side UP function body, and receive a user plane modification completion message from the original RAN-side UP function body.

The new RAN-side UP function body may be specifically a user plane in the core network connected to the RAN on the new user plane path. The original RAN-side UP function body may be specifically a user plane in the core network connected to the RAN on the original user plane path. In the second circumstance, the service request may be initiated by the network.

In a third circumstance, the user plane path for the UE is changed.

In the third circumstance, the procedure of establishing, by the SM function body, the user plane connection for the UE will be described as follows.

At first, the SM function body may determine that a new user plane path is to be reselected for the UE in accordance with the connection information about the connection between the RAN and the UE and the SM-related information (which may include the position about the current position of the UE).

Next, the SM function body may generate and transmit the user plane configuration instruction to a new UP function body and a DN-side UP function body on the new user plane path. The user plane configuration instruction may be adopted to indicate the new UP function body to establishing the routing or forwarding rule, and indicate the DN-side UP function body to modify the user plane path, and forward a received data message to be transmitted to the UE to the new UP function body.

Finally, the SM function body may receive the user plane establishment completion message from the new UP function body, and receive the user plane modification completion message from the DN-side UP function body.

The new UP function body may specifically include a new RAN-side UP function body and any other UP function body in the core network on the new user plane path. The DN-side UP function body may specifically include a user plane in the core network connected to a data network DN on the new user plane path. In the third circumstance, the service request may be initiated by the UE itself and by the network.

In this embodiment, upon the receipt of the user plane establishment completion message from the new UP function body and the user plane modification completion message from the DN-side UP function body, the SM function body may further generate and transmit a user plane deletion instruction to an original UP function body on an original user plane path for the UE. The user plane deletion instruction may be adopted to indicate the original UP function body to release the user plane connection for the UE, and receive a user plane deletion completion message from the original UP function body.

In a fourth circumstance, the user plane path for the UE is changed.

In the fourth circumstance, the procedure of establishing, by the SM function body, the user plane connection for the UE will be described as follows.

At first, the SM function body may determine that the new user plane path is to be reselected for the UE in accordance with the connection information about the connection between the RAN and the UE and the SM-related information (which may include the information about the current position of the UE).

Next, the SM function body may generate and transmit the user plane configuration instruction to a new UP function body and a DN-side UP function body on the new user plane path. The user plane configuration instruction may be adopted to indicate the new UP function body to establish the routing or forwarding rule, and indicate the DN-side UP function body to modify the user plane path and forward the received data message to be transmitted to the UE to the new UP function body.

Finally, the SM function body may receive the user plane establishment completion message from the new UP function body, and receive the user plane modification completion message from the DN-side UP function body.

In this embodiment, upon the user plane establishment completion message from the new UP function body and the user plane modification completion message from the DN-side UP function body, the SM function body may further generate and transmit the user plane configuration instruction to an original UP function body on an original user plane path for the UE. The user plane configuration instruction may be adopted to indicate the original UP function body to establish the user plane path, forward the received data message to the DN-side UP function body, and receive the user plane modification completion message from the original UP function body.

Upon the receipt of the user plane modification completion message from the original UP function body, the SM function body may further enable a timer. The timer is configured to determine a life cycle of the user plane path established by the original UP function body. When the timer is expired, the SM function body may generate and transmit the user plane deletion instruction to the original UP function body. The user plane deletion instruction may be adopted to indicate the original UP function body to release the user plane connection for the UE, and receive the user plane deletion completion message from the original UP function body.

In this embodiment, the UE idle state processing method may further include: receiving a user plane connection deactivation request message from the MM function body; generating and transmitting the user plane configuration instruction to an RAN-side UP function body in accordance with the user plane connection deactivation request message, the user plane configuration instruction being adopted to indicate the RAN-side UP function body to modify a downlink user plane path; receiving the user plane modification completion message from the RAN-side UP function body; and transmitting a user plane connection deactivation completion message to the MM function body in accordance with the user plane modification completion message (the implementation thereof may refer to that mentioned in the second embodiment).

The user plane connection deactivation request message may carry at least one of a UE identity, an MM context identity, a base station identity and a release cause.

The connection with the UE released by the RAN may include a signaling connection, a user plane connection and/or deletion of UE context information.

A procedure of enabling the UE to be switched from the idle state into the connected state in the fourth embodiment will be described hereinafter in conjunction with FIGS. 7A to 7J.

Example 1

Figure 7A:
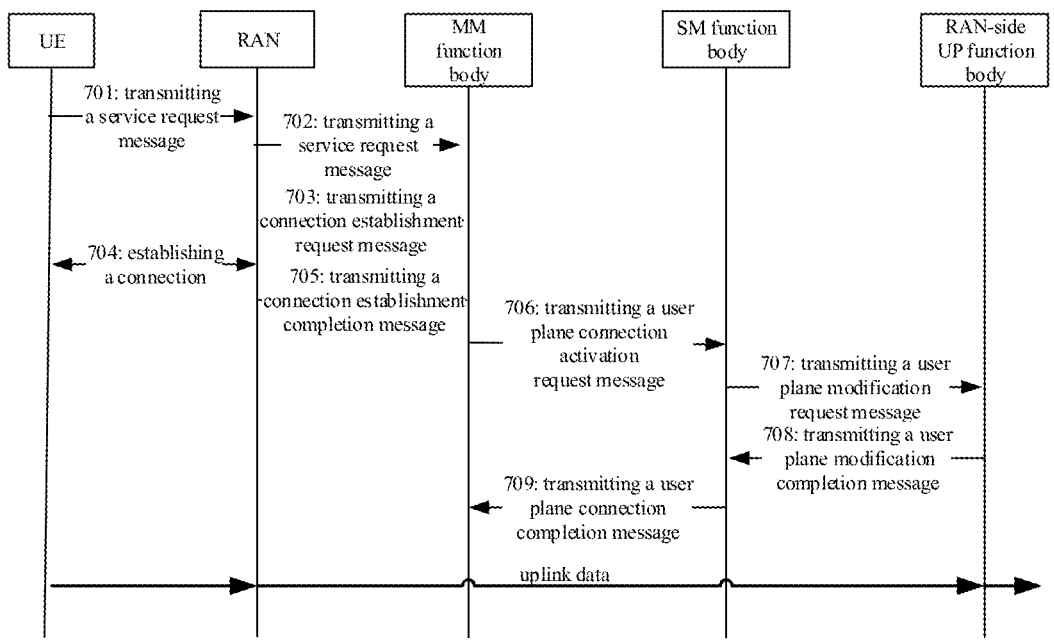

In Example 1, the UE may initiate the service request by itself, the user plane path for the UE may remain unchanged, and the MM function body may process a connection request between the RAN and the UE. As shown in FIG. 7A, the procedure of enabling the UE to be switched into the connected state may include the following steps.

Step 701: transmitting, by the UE, the service request to the RAN.

Step 702: forwarding, by the RAN, the service request message to the MM function body.

Step 703: upon the receipt of the service request message, updating, by the MM function body, the information about the position of the UE, and transmitting the connection establishment request message to the RAN, so as to request the RAN to establish the connection with the UE, at least including the signaling connection, the user plane connection and creation of UE-related (context) information.

Step 704: establishing, by the RAN, the connection with the UE.

Step 705: after the connection establishment, transmitting, by the RAN, the connection establishment completion message to the MM function body.

Step 706: upon the receipt of the connection establishment completion message, transmitting, by the MM function body, the user plane connection activation request message including the session modification request, to the SM function body.

Step 707: determining, by the SM function body, the user plane path for the UE as unchanged in accordance with the SM-related information and the information about the current position of the UE, and generating and transmitting the user plane configuration instruction (via the user plane modification request message) to the RAN-side UP function body, so as to indicate the RAN-side UP function body to modify the downlink user plane path, i.e., transmit the downlink data message in accordance with the routing or forwarding rule upon the receipt of the downlink data message.

Step 708: transmitting, by the RAN-side UP function body, the user plane modification completion message to the SM function body.

Step 709: upon the receipt of the user plane modification completion message, transmitting, by the SM function body, the user plane connection completion message to the MM function body, so as to complete the establishment of the user plane connection for the UE.

Example 2

Figure 7B:
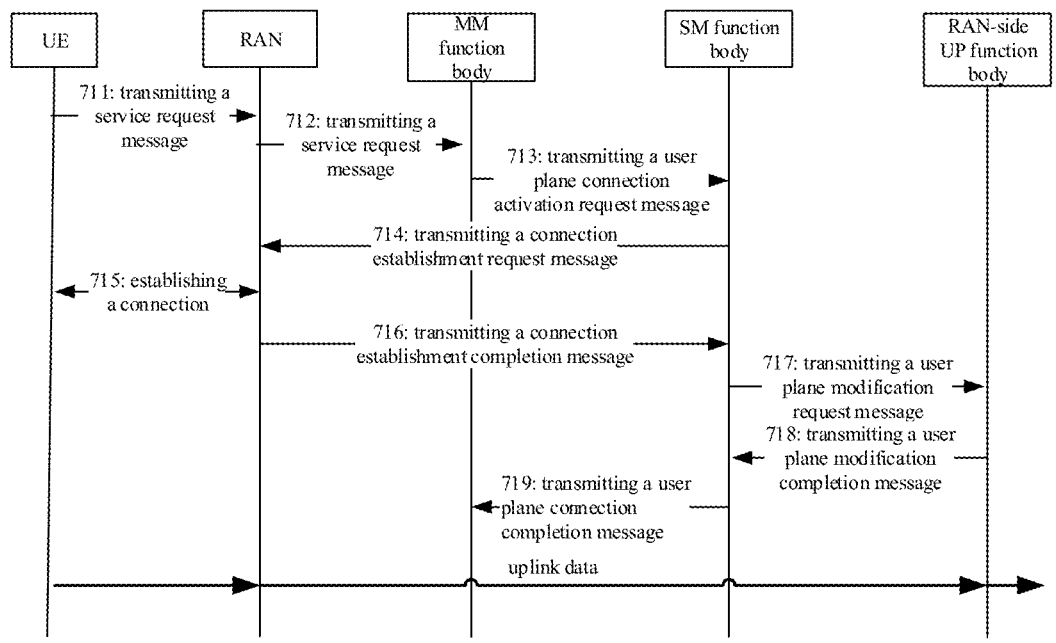

In Example 2, the UE may initiate the service request by itself, the user plane path for the UE may remain unchanged, and the SM function body may process the connection request between the RAN and the UE. As shown in FIG. 7B, the procedure of enabling the UE to be switched into the connected state may include the following steps.

Step 711: transmitting, by the UE, the service request to the RAN.

Step 712: forwarding, by the RAN, the service request message to the MM function body.

Step 713: upon the receipt of the service request message, updating, by the MM function body, the information about the position of the UE, and transmitting the user plane connection activation request message including the session modification request, to the SM function body.

Step 714: transmitting, by the SM function body, the connection establishment request message to the RAN, so as to request the RAN to establish the connection with the UE, at least including the signaling connection, the user plane connection and creation of UE-related (context) information. The connection establishment request message may be directly transmitted to the RAN, or forwarded by the MM function body or any other network element.

Step 715: establishing, by the RAN, the connection with the UE.

Step 716: after the connection establishment, transmitting, by the RAN, the connection establishment completion message to the SM function body. The connection establishment completion message may be directly transmitted to the SM function body, or forwarded by the MM function body or any other network element.

Step 717: determining, by the SM function body, the user plane path for the UE as unchanged in accordance with the SM-related information and the information about the current position of the UE, and generating and transmitting the user plane configuration instruction (via the user plane modification request message) to the RAN-side UP function body, so as to indicate the RAN-side UP function body to modify the downlink user plane path, i.e., transmit the downlink data message in accordance with the routing or forwarding rule upon the receipt of the downlink data message.

Step 718: transmitting, by the RAN-side UP function body, the user plane modification completion message to the SM function body.

Step 719: upon the receipt of the user plane modification completion message, transmitting, by the SM function body, the user plane connection completion message to the MM function body, so as to complete the establishment of the user plane connection for the UE.

Example 3

Figure 7C:
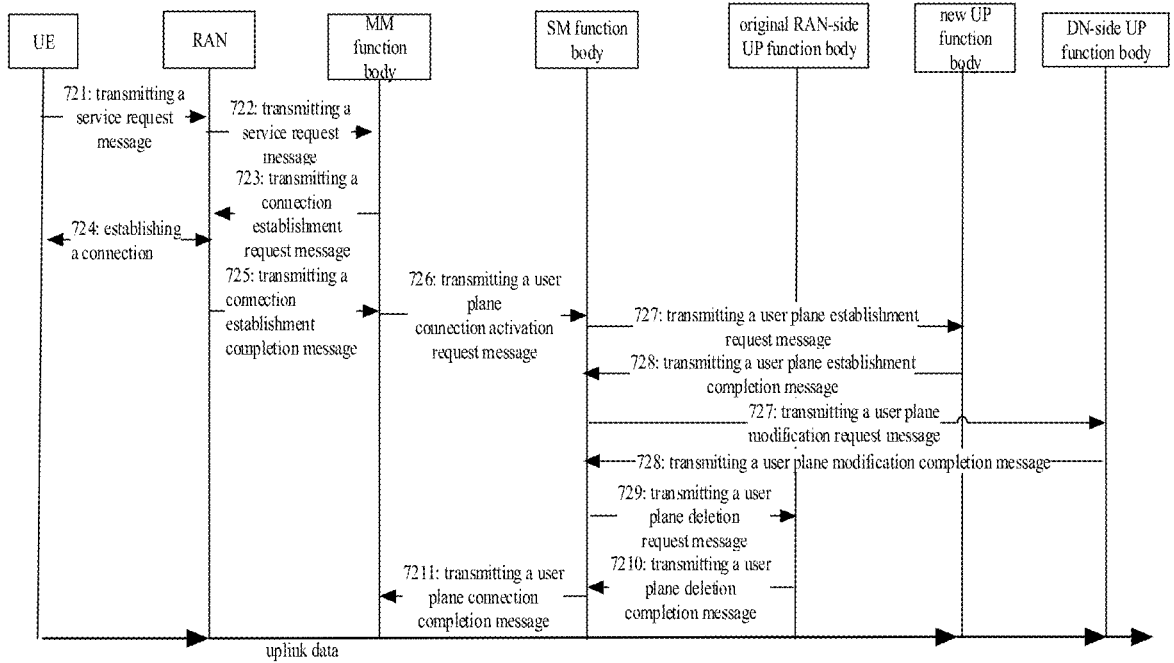

In Example 3, the UE may initiate the service request by itself, the user plane path for the UE may be changed, and the MM function body may process a connection request between the RAN and the UE. As shown in FIG. 7C, the procedure of enabling the UE to be switched into the connected state may include the following steps.

Step 721: transmitting, by the UE, the service request to the RAN.

Step 722: forwarding, by the RAN, the service request message to the MM function body.

Step 723: upon the receipt of the service request message, updating, by the MM function body, the information about the position of the UE, and transmitting the connection establishment request message to the RAN, so as to request the RAN to establish the connection with the UE, at least including the signaling connection, the user plane connection and creation of UE-related (context) information.

Step 724: establishing, by the RAN, the connection with the UE.

Step 725: after the connection establishment, transmitting, by the RAN, the connection establishment completion message to the MM function body.

Step 726: upon the receipt of the connection establishment completion message, transmitting, by the MM function body, the user plane connection activation request message including the session modification request, to the SM function body.

Step 727: determining, by the SM function body, that a new user plane path is to be reselected for the UE in accordance with the SM-related information, the information about the current position of the UE, the service requirement, the node load and the link congestion level, and generating and transmitting the user plane configuration instruction to the new UP function body and the DN-side UP function body on the new user plane path, i.e., transmitting the user plane establishment request message to the new UP function body and transmitting the user plane modification request message to the DN-side UP function body. The user plane configuration instruction may be adopted to indicate the new UP function body to establish the routing or forwarding rule, indicate the DN-side UP function body to modify the user plane path, and forward the received data message to be transmitted to the UE to the new UP function body.

Step 728: transmitting, by the new UP function body, the user plane establishment completion message to the SM function body, and transmitting, by the DN-side UP function body, the user plane modification completion message to the SM function body.

Step 729: generating and transmitting, by the SM function body, the user plane deletion instruction (via the user plane deletion request message) to the original UP function body, so as to indicate the original UP function body to release the user plane connection for the UE.

Step 7210: transmitting, by the original UP function body, the user plane deletion completion message to the SM function body.

Step 7211: upon the receipt of the user plane deletion completion message, transmitting, by the SM function body, the user plane connection completion message to the MM function body.

Example 4

Figure 7D:
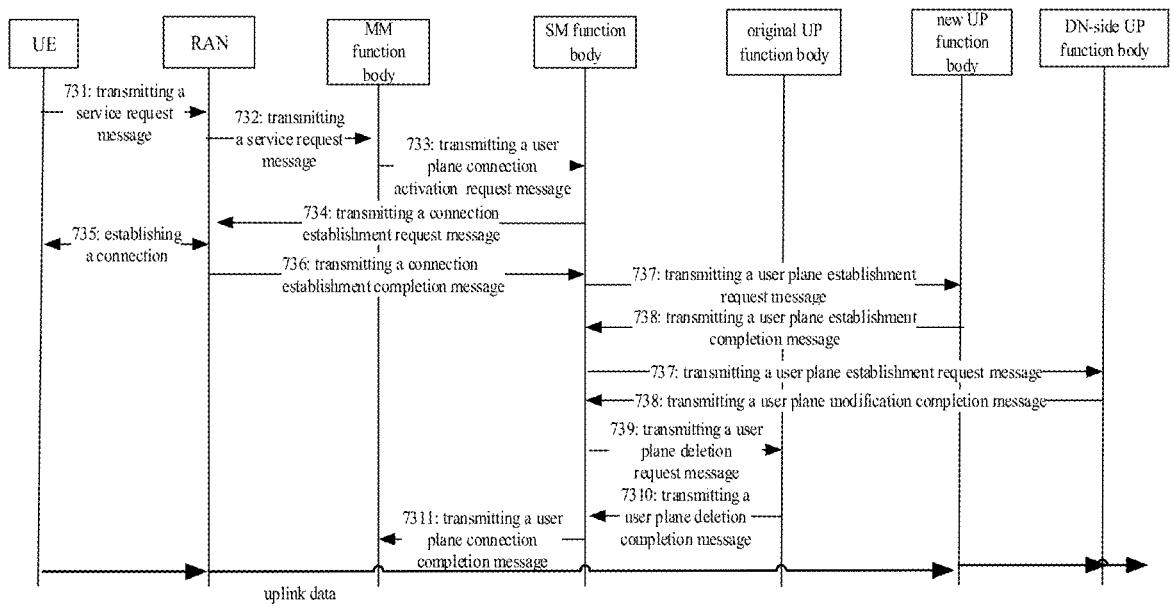

In Example 4, the UE may initiate the service request by itself, the user plane path for the UE may be changed, and the SM function body may process the connection request between the RAN and the UE. As shown in FIG. 7D, the procedure of enabling the UE to be switched into the connected state may include the following steps.

Step 731: transmitting, by the UE, the service request to the RAN.

Step 732: forwarding, by the RAN, the service request message to the MM function body.

Step 733: upon the receipt of the service request message, updating, by the MM function body, the information about the position of the UE, and transmitting the user plane connection activation request message including the session modification request, to the SM function body.

Step 734: transmitting, by the SM function body, the connection establishment request message to the RAN, so as to request the RAN to establish the connection with the UE, at least including the signaling connection, the user plane connection and creation of UE-related (context) information. The connection establishment request message may be directly transmitted to the RAN, or forwarded by the MM function body or any other network element.

Step 735: establishing, by the RAN, the connection with the UE.

Step 736: after the connection establishment, transmitting, by the RAN, the connection establishment completion message to the SM function body. The connection establishment completion message may be directly transmitted to the SM function body, or forwarded by the MM function body or any other network element.

Step 737: determining, by the SM function body, that a new user plane path is to be reselected for the UE in accordance with the SM-related information, the information about the current position of the UE, the service requirement, the node load and the link congestion level, and generating and transmitting the user plane configuration instruction to the new UP function body and the DN-side UP function body on the new user plane path, i.e., transmitting the user plane establishment request message to the new UP function body and transmitting the user plane modification request message to the DN-side UP function body. The user plane configuration instruction may be adopted to indicate the new UP function body to establish the routing or forwarding rule, indicate the DN-side UP function body to modify the user plane path, and forward the received data message to be transmitted to the UE to the new UP function body.

Step 738: transmitting, by the new UP function body, the user plane establishment completion message to the SM function body, and transmitting, by the DN-side UP function body, the user plane modification completion message to the SM function body.

Step 739: generating and transmitting, by the SM function body, the user plane deletion instruction (via the user plane deletion request message) to the original UP function body, so as to indicate the original UP function body to release the user plane connection for the UE.

Step 7310: transmitting, by the original UP function body, the user plane deletion completion message to the SM function body.

Step 7311: upon the receipt of the user plane deletion completion message, transmitting, by the SM function body, the user plane connection completion message to the MM function body.

Example 5

Figure 7E:
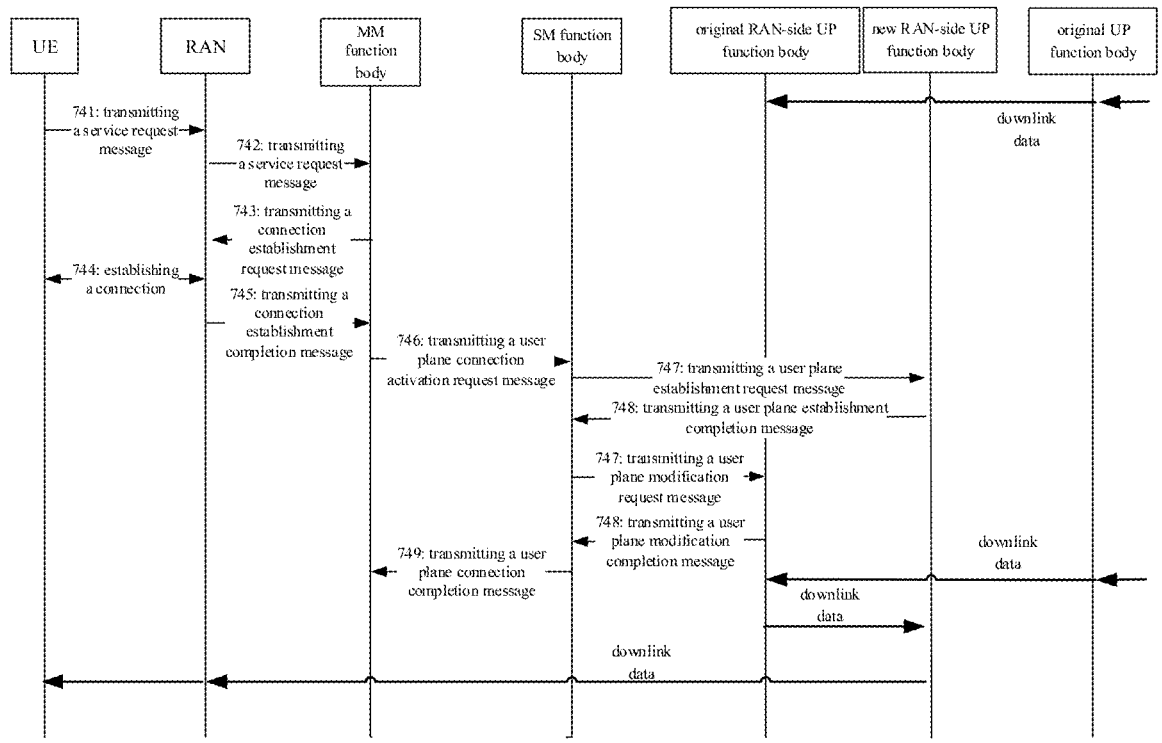

In Example 5, the network may initiate the service request, the user plane path for the UE may be changed, and the MM function body may process a connection request between the RAN and the UE. As shown in FIG. 7E, the procedure of enabling the UE to be switched into the connected state may include the following steps.

Step 741: transmitting, by the UE, the service request to the RAN.

Step 742: forwarding, by the RAN, the service request message to the MM function body.

Step 743: upon the receipt of the service request message, updating, by the MM function body, the information about the position of the UE, and transmitting the connection establishment request message to the RAN, so as to request the RAN to establish the connection with the UE, at least including the signaling connection, the user plane connection and creation of UE-related (context) information.

Step 744: establishing, by the RAN, the connection with the UE.

Step 745: after the connection establishment, transmitting, by the RAN, the connection establishment completion message to the MM function body.

Step 746: upon the receipt of the connection establishment completion message, transmitting, by the MM function body, the user plane connection activation request message including the session modification request, to the SM function body.

Step 747: determining, by the SM function body, that a new user plane path is to be reselected for the UE in accordance with the SM-related information and the information about the current position of the UE, generating and transmitting the user plane configuration instruction (via the user plane establishment request message) to the new RAN-side UP function body, so as to indicate the new RAN-side UP function body to establish the routing or forwarding rule, i.e., route or forward the received uplink data message to be transmitted to the UE to the original RAN-side UP function body (the uplink routing or forwarding rule), and transmitting the user plane modification request message to the original RAN-side UP function body, so as to indicate the original RAN-side UP function body to modify the user plane path, i.e., to route or forward the received downlink data message to be transmitted to the UE to the new RAN-side UP function body (the downlink routing or forwarding rule).

Step 748: transmitting, by the new RAN-side UP function body, the user plane establishment completion message to the SM function body, and transmitting, by the original RAN-side UP function body, the user plane modification completion message to the SM function body.

Step 749: upon the receipt of the user plane establishment/modification completion message, transmitting, by the SM function body, the user plane connection completion message to the MM function body.

Example 6

Figure 7F:
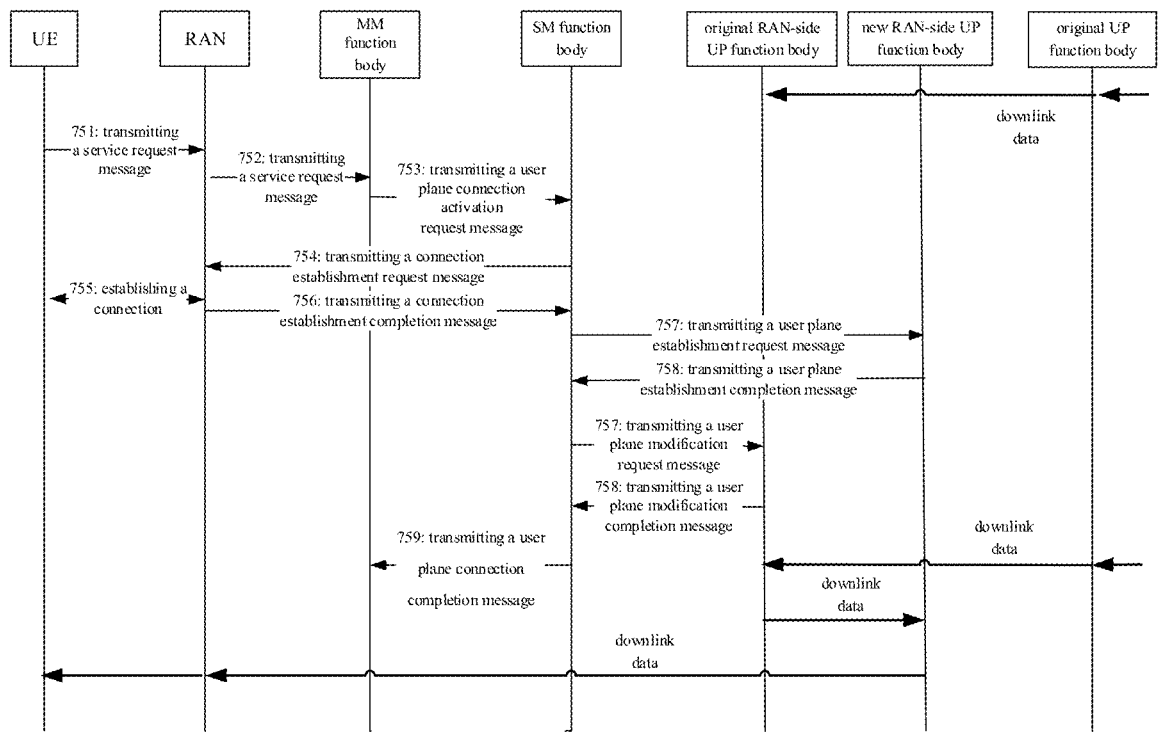

In Example 6, the network may initiate the service request, the user plane path for the UE may be changed, and the SM function body may process a connection request between the RAN and the UE. As shown in FIG. 7F, the procedure of enabling the UE to be switched into the connected state may include the following steps.

Step 751: transmitting, by the UE, the service request to the RAN.

Step 752: forwarding, by the RAN, the service request message to the MM function body.

Step 753: upon the receipt of the service request message, updating, by the MM function body, the information about the position of the UE and transiting the user plane connection activation request message including the session modification request, to the SM function body.

Step 754: transmitting, by the SM function body, the connection establishment request message to the RAN, so as to request the RAN to establish the connection with the UE, at least including the signaling connection, the user plane connection and creation of UE-related (context) information. The connection establishment request message may be directly transmitted to the RAN, or forwarded by the MM function body or any other network element.

Step 755: establishing, by the RAN, the connection with the UE.

Step 756: after the connection establishment, transmitting, by the RAN, the connection establishment completion message to the SM function body. The connection establishment completion message may be directly transmitted to the SM function body, or forwarded by the MM function body or any other network element.

Step 757: determining, by the SM function body, that a new user plane path is to be reselected for the UE in accordance with the SM-related information and the information about the current position of the UE, generating and transmitting the user plane configuration instruction (via the user plane establishment request message) to the new RAN-side UP function body, so as to indicate the new RAN-side UP function body to establish the routing or forwarding rule, i.e., route or forward the received uplink data message to be transmitted to the UE to the original RAN-side UP function body (the uplink routing or forwarding rule), and transmitting the user plane modification request message to the original RAN-side UP function body, so as to indicate the original RAN-side UP function body to modify the user plane path, i.e., to route or forward the received downlink data message to be transmitted to the UE to the new RAN-side UP function body (the downlink routing or forwarding rule).

Step 758: transmitting, by the new RAN-side UP function body, the user plane establishment completion message to the SM function body, and transmitting, by the original RAN-side UP function body, the user plane modification completion message to the SM function body.

Step 759: upon the receipt of the user plane establishment/modification completion message, transmitting, by the SM function body, the user plane connection completion message to the MM function body.

Example 7

Figure 7G:
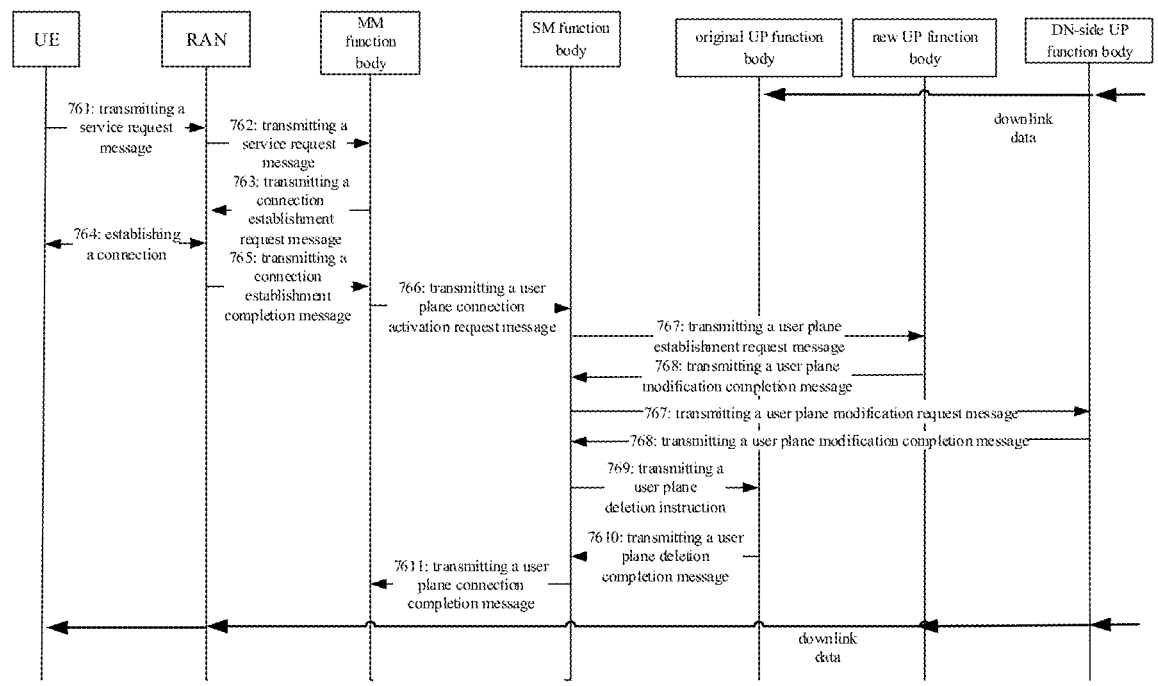

In Example 7, the network may initiate the service request, the user plane path for the UE may be changed, and the MM function body may process a connection request between the RAN and the UE. As shown in FIG. 7G, the procedure of enabling the UE to be switched into the connected state may include the following steps.

Step 761: transmitting, by the UE, the service request to the RAN.

Step 762: forwarding, by the RAN, the service request message to the MM function body.

Step 763: upon the receipt of the service request message, updating, by the MM function body, the information about the position of the UE, and transmitting the connection establishment request message to the RAN, so as to request the RAN to establish the connection with the UE, at least including the signaling connection, the user plane connection and creation of UE-related (context) information.

Step 764: establishing, by the RAN, the connection with the UE.

Step 765: after the connection establishment, transmitting, by the RAN, the connection establishment completion message to the MM function body.

Step 766: upon the receipt of the connection establishment completion message, transmitting, by the MM function body, the user plane connection activation request message including the session modification request, to the SM function body.

Step 767: determining, by the SM function body, that a new user plane path is to be reselected for the UE in accordance with the SM-related information, the information about the current position of the UE, the service requirement, the node load and the link congestion level, and generating and transmitting the user plane configuration instruction to the new UP function body and the DN-side UP function body on the new user plane path, i.e., transmitting the user plane establishment request message to the new UP function body and transmitting the user plane modification request message to the DN-side UP function body. The user plane configuration instruction may be adopted to indicate the new UP function body to establish the routing or forwarding rule, indicate the DN-side UP function body to modify the user plane path, and forward the received data message to be transmitted to the UE to the new UP function body.

Step 768: transmitting, by the new UP function body, the user plane establishment completion message to the SM function body, and transmitting, by the DN-side UP function body, the user plane modification completion message to the SM function body.

Step 769: generating and transmitting, by the SM function body, the user plane deletion instruction (via the user plane deletion request message) to the original UP function body, so as to indicate the original UP function body to release the user plane connection for the UE and process (discard) the received data message.

Step 7610: transmitting, by the original UP function body, the user plane deletion completion message to the SM function body.

Step 7611: upon the receipt of the user plane deletion completion message, transmitting, by the SM function body, the user plane connection completion message to the MM function body.

Example 8

Figure 7H:
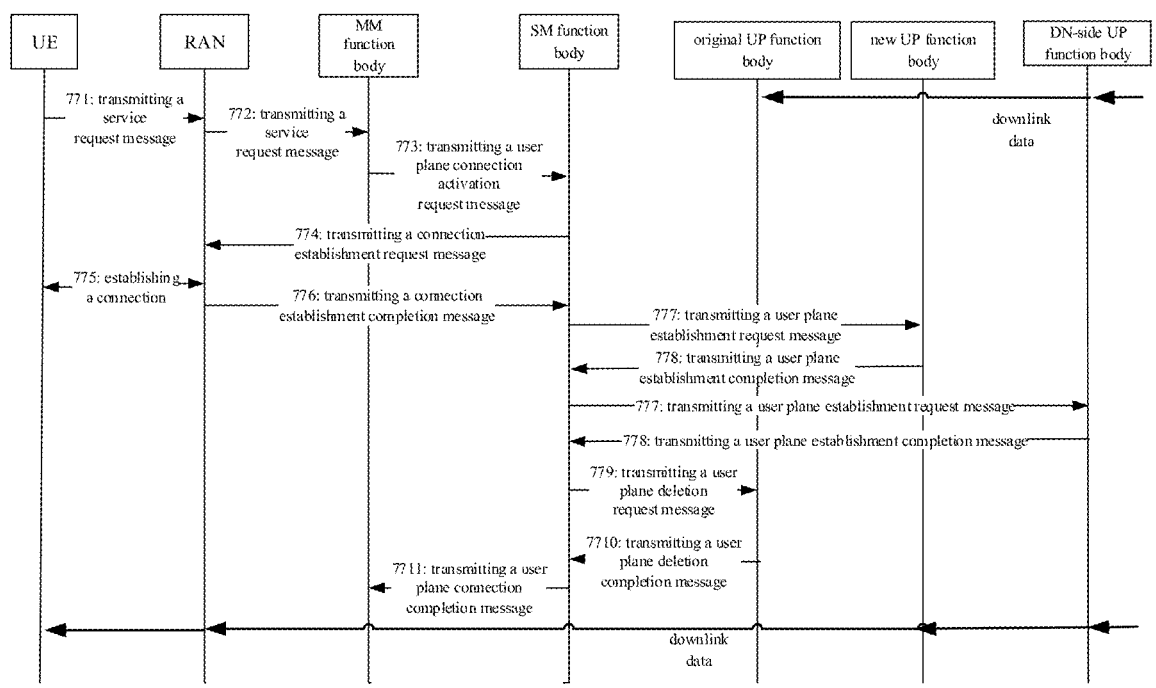
Figure 71:
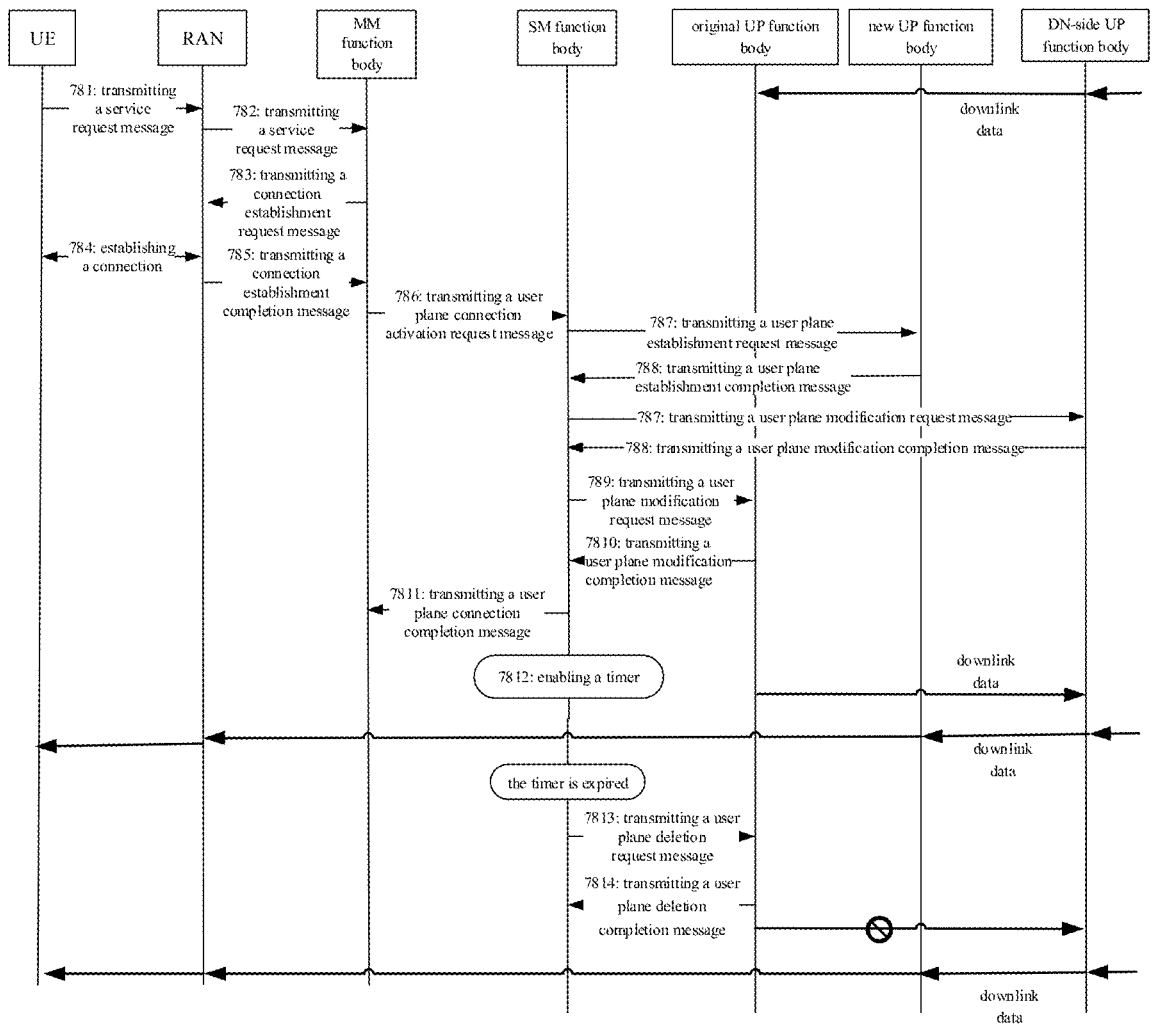

In Example 8, the network may initiate the service request, the user plane path for the UE may be changed, and the SM function body may process a connection request between the RAN and the UE. As shown in FIG. 7H, the procedure of enabling the UE to be switched into the connected state may include the following steps.

Step 771: transmitting, by the UE, the service request to the RAN.

Step 772: forwarding, by the RAN, the service request message to the MM function body.

Step 773: upon the receipt of the service request message, updating, by the MM function body, the information about the position of the UE, and transmitting the user plane connection activation request message including the session modification request, to the SM function body.

Step 774: transmitting, by the SM function body, the connection establishment request message to the RAN, so as to request the RAN to establish the connection with the UE, at least including the signaling connection, the user plane connection and creation of UE-related (context) information. The connection establishment request message may be directly transmitted to the RAN, or forwarded by the MM function body or any other network element.

Step 775: establishing, by the RAN, the connection with the UE.

Step 776: after the connection establishment, transmitting, by the RAN, the connection establishment completion message to the SM function body. The connection establishment completion message may be directly transmitted to the SM function body, or forwarded by the MM function body or any other network element.

Step 777: determining, by the SM function body, that a new user plane path is to be reselected for the UE in accordance with the SM-related information, the information about the current position of the UE, the service requirement, the node load and the link congestion level, and generating and transmitting the user plane configuration instruction to the new UP function body and the DN-side UP function body on the new user plane path, i.e., transmitting the user plane establishment request message to the new UP function body and transmitting the user plane modification request message to the DN-side UP function body. The user plane configuration instruction may be adopted to indicate the new UP function body to establish the routing or forwarding rule, indicate the DN-side UP function body to modify the user plane path, and forward the received data message to be transmitted to the UE to the new UP function body.

Step 778: transmitting, by the new UP function body, the user plane establishment completion message to the SM function body, and transmitting, by the DN-side UP function body, the user plane modification completion message to the SM function body.

Step 779: generating and transmitting, by the SM function body, the user plane deletion instruction (via the user plane deletion request message) to the original UP function body, so as to indicate the original UP function body to release the user plane connection for the UE and process (discard) the received data message.

Step 7710: transmitting, by the original UP function body, the user plane deletion completion message to the SM function body.

Step 7711: upon the receipt of the user plane deletion completion message, transmitting, by the SM function body, the user plane connection completion message to the MM function body.

Example 9

In Example 9, the network may initiate the service request, the user plane path for the UE may be changed, and the MM function body may process a connection request between the RAN and the UE. As shown in FIG. 7I, the procedure of enabling the UE to be switched into the connected state may include the following steps.

Step 781: transmitting, by the UE, the service request to the RAN.

Step 782: forwarding, by the RAN, the service request message to the MM function body.

Step 783: upon the receipt of the service request message, updating, by the MM function body, the information about the position of the UE, and transmitting the connection establishment request message to the RAN, so as to request the RAN to establish the connection with the UE, at least including the signaling connection, the user plane connection and creation of UE-related (context) information.

Step 784: establishing, by the RAN, the connection with the UE.

Step 785: after the connection establishment, transmitting, by the RAN, the connection establishment completion message to the SM function body.

Step 786: upon the receipt of the connection establishment completion message, transmitting, by the MM function body, the user plane connection activation request message including the session modification request, to the SM function body.

Step 787: determining, by the SM function body, that a new user plane path is to be reselected for the UE in accordance with the SM-related information, the information about the current position of the UE, the service requirement, the node load and the link congestion level, and generating and transmitting the user plane configuration instruction to the new UP function body and the DN-side UP function body on the new user plane path, i.e., transmitting the user plane establishment request message to the new UP function body and transmitting the user plane modification request message to the DN-side UP function body. The user plane configuration instruction may be adopted to indicate the new UP function body to establish the routing or forwarding rule, indicate the DN-side UP function body to modify the user plane path, and forward the received data message to be transmitted to the UE to the new UP function body.

Step 788: transmitting, by the new UP function body, the user plane establishment completion message to the SM function body, and transmitting, by the DN-side UP function body, the user plane modification completion message to the SM function body.

Step 789: generating and transmitting, by the SM function body, the user plane configuration instruction (via the user plane modification request message) to the original UP function body, so as to indicate the original UP function body to establish the user plane path, and forward the received data message to the DN-side UP function body.

Step 7810: transmitting, by the original UP function body, the user plane modification completion message to the SM function body.

Step 7811: transmitting, by the SM function body, the user plane connection completion message to the MM function body.

Step 7812: enabling, by the SM function body, the timer which is configured to determine a life cycle of the user plane path established by the original UP function body, and reserving a downlink flow table.

Step 7813: when the timer is expired, generating and transmitting, by the SM function body, the user plane deletion instruction (via the user plane deletion request message) to the original UP function body, so as to indicate the original UP function body to release the user plane connection for the UE.

Step 7814: transmitting, by the original UP function body, the user plane deletion completion message to the SM function body.

Example 10

Figure 7J:
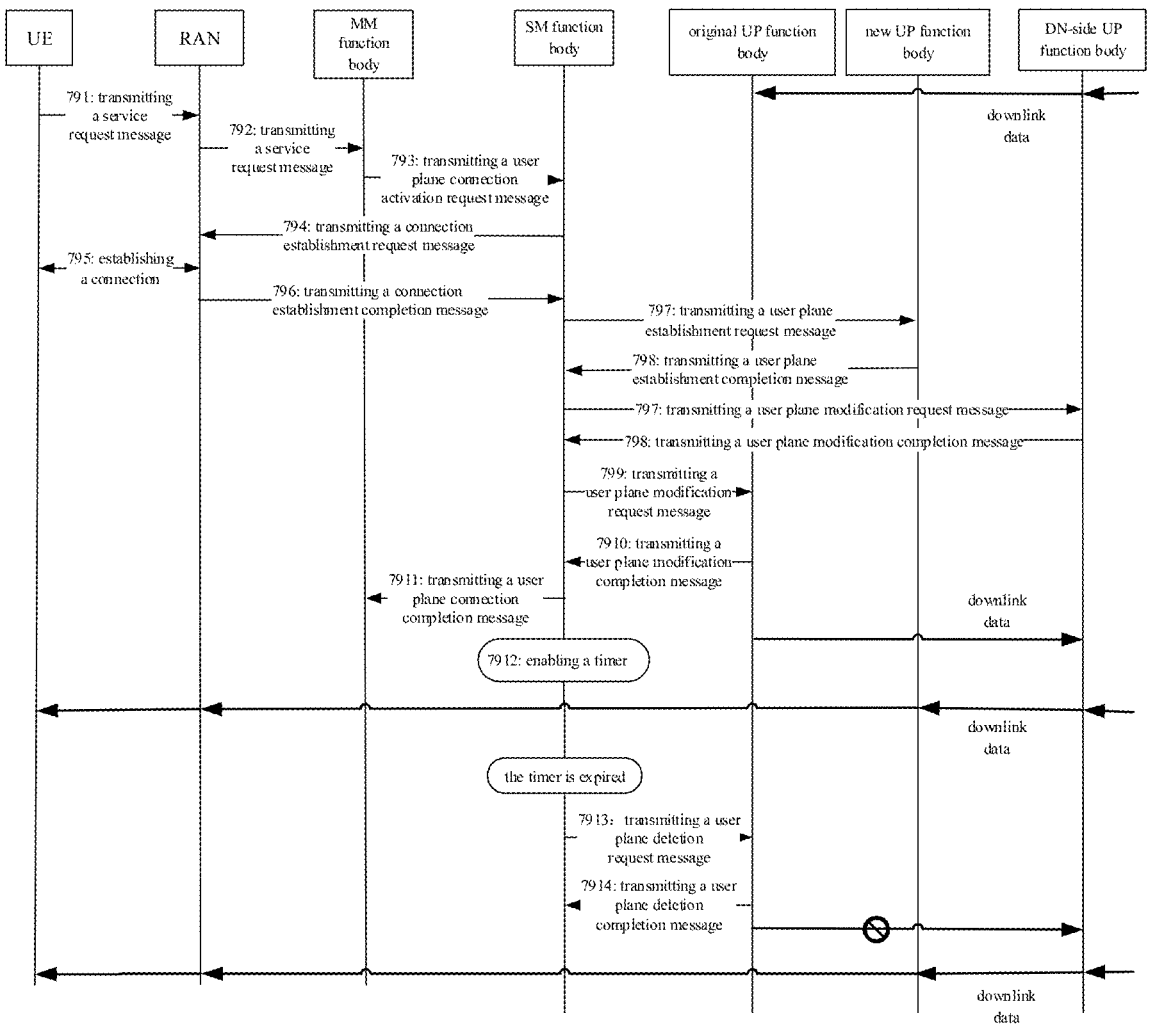

In Example 10, the network may initiate the service request, the user plane path for the UE may be changed, and the SM function body may process a connection request between the RAN and the UE. As shown in FIG. 7J, the procedure of enabling the UE to be switched into the connected state may include the following steps.

Step 791: transmitting, by the UE, the service request to the RAN.

Step 792: forwarding, by the RAN, the service request message to the MM function body.

Step 793: upon the receipt of the service request message, updating, by the MM function body, the information about the position of the UE, and transmitting the user plane connection activation request message including the session modification request, to the SM function body.

Step 794: transmitting, by the SM function body, the connection establishment request message to the RAN, so as to request the RAN to establish the connection with the UE, at least including the signaling connection, the user plane connection and creation of UE-related (context) information. The connection establishment request message may be directly transmitted to the RAN, or forwarded by the MM function body or any other network element.

Step 795: establishing, by the RAN, the connection with the UE.

Step 796: after the connection establishment, transmitting, by the RAN, the connection establishment completion message to the SM function body. The connection establishment completion message may be directly transmitted to the SM function body, or forwarded by the MM function body or any other network element.

Step 797: determining, by the SM function body, that a new user plane path is to be reselected for the UE in accordance with the SM-related information, the information about the current position of the UE, the service requirement, the node load and the link congestion level, and generating and transmitting the user plane configuration instruction to the new UP function body and the DN-side UP function body on the new user plane path, i.e., transmitting the user plane establishment request message to the new UP function body and transmitting the user plane modification request message to the DN-side UP function body. The user plane configuration instruction may be adopted to indicate the new UP function body to establish the routing or forwarding rule, indicate the DN-side UP function body to modify the user plane path, and forward the received data message to be transmitted to the UE to the new UP function body.

Step 798: transmitting, by the new UP function body, the user plane establishment completion message to the SM function body, and transmitting, by the DN-side UP function body, the user plane modification completion message to the SM function body.

Step 799: generating and transmitting, by the SM function body, the user plane deletion instruction (via the user plane modification request message) to the original UP function body, so as to indicate the original UP function body to establish the user plane path, and forward the received data message to the DN-side UP function body.

Step 7910: transmitting, by the original UP function body, the user plane modification completion message to the SM function body.

Step 7911: transmitting, by the SM function body, the user plane connection completion message to the MM function body.

Step 7912: enabling, by the SM function body, the timer which is configured to determine the life cycle of the user plane path established by the original UP function body, and reserving the downlink flow table.

Step 7913: when the timer is expired, generating and transmitting, by the SM function body, the user plane deletion instruction (via the user plane deletion request message) to the original UP function body, so as to indicate the original UP function body to release the user plane connection for the UE.

Step 7914: transmitting, by the original UP function body, the user plane deletion completion message to the SM function body.

According to the UE idle state processing method in the third embodiment of the present disclosure, in the case that an MM function is separated from an SM function, through the signaling interaction between the MM function body and the SM function body, the user plane connection may be established for the UE, so as to enable the UE to be switched from the idle state to the connected state. As a result, it is able to reduce the signaling overhead between the control plane and the user plane, thereby to shorten a time delay for the UE to be in the connected state.

Fifth Embodiment

Figure 8:
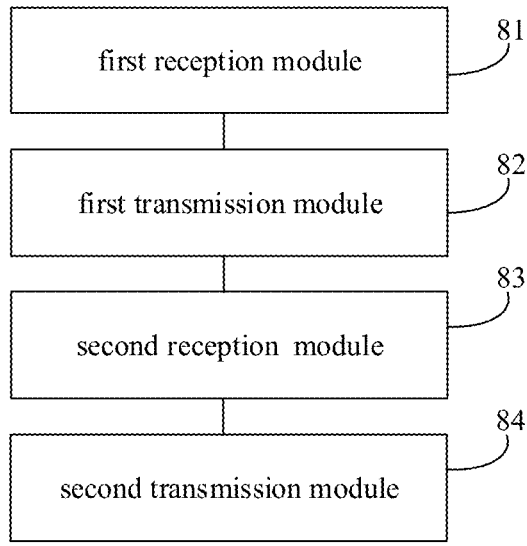
FIG. 8 is a schematic view showing a UE idle state processing device according to a fifth embodiment of the present disclosure.

The present disclosure further provides in this embodiment a UE idle state processing device for use in an MM function body. As shown in FIG. 8, the UE idle state processing device may include: a first reception module 81 configured to receive a connection release request message from an RAN; a first transmission module 82 configured to transmit a user plane connection deactivation request message to an SM function body in accordance with the connection release request message, the user plane connection deactivation request message being adopted to indicate the SM function body to modify a user plane path; a second reception module 83 configured to receive a user plane connection deactivation completion message from the SM function body; and a second transmission module 84 configured to, upon the receipt of the user plane connection deactivation completion message, transmit a connection release instruction to the RAN, the connection release instruction being adopted to indicate the RAN to release the connection with the UE.

The connection release request message or the user plane connection deactivation request message may carry at least one of an UE identity, an MM context identity, a base station identity and a release cause.

The connection with the UE released by the RAN may include a signaling connection, user plane connection and/or deletion of UE context information.

Figure 9:
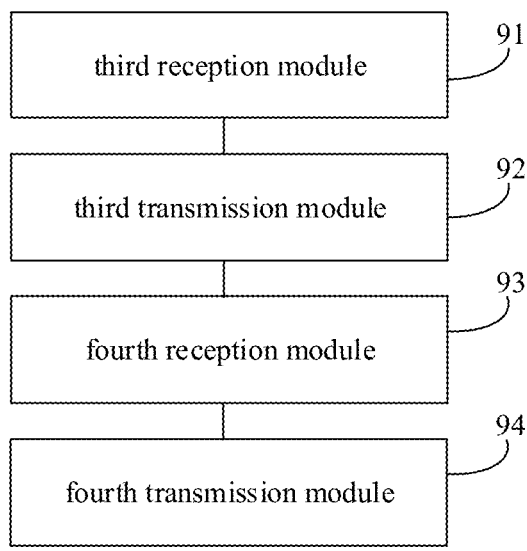
FIG. 9 is another schematic view showing the UE idle state processing device according to the fifth embodiment of the present disclosure.

The present disclosure further provides in this embodiment a UE idle state processing device for use in an SM function body. As shown in FIG. 9, the UE idle state processing device may include: a third reception module 91 configured to receive a user plane connection deactivation request message from an MM function body; a third transmission module 92 configured to generate and transmit a user plane configuration instruction to an RAN-side UP function body in accordance with the user plane connection deactivation request message, the user plane configuration instruction being adopted to indicate the RAN-side UP function body to modify a downlink user plane path; a fourth reception module 93 configured to receive a user plane modification completion message from the RAN-side UP function body; and a fourth transmission module 94 configured to transmit a user plane connection deactivation completion message to the MM function body in accordance with the user plane modification completion message.

The user plane connection deactivation request message may carry at least one of a UE identity, an MM context identity, a base station identity and a release cause.

The connection with the UE released by the RAN may include a signaling connection, a user plane connection and/or deletion of UE context information.

Figure 10:
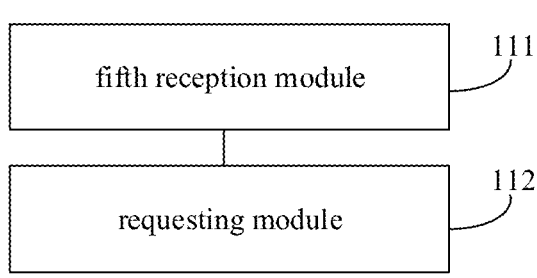
FIG. 10 is yet another schematic view showing the UE idle state processing device according to the fifth embodiment of the present disclosure.

The present disclosure further provides in this embodiment a UE idle state processing device for use in an MM function body. As shown in FIG. 10, the UE idle state processing device may include: a fifth reception module 111 configured to receive a service request message from a UE forwarded by an RAN; and a requesting module 112 configured to request an SM function body to establish a user plane connection for the UE in accordance with the service request message.

In a possible embodiment of the present disclosure, the requesting module 112 may include: a requesting unit configured to request the RAN to establish a connection with the UE and acquire connection information about the connection between the RAN and the UE in accordance with the service request message; and a first transmission unit configured to transmit a user plane connection activation request message to the SM function body, the user plane connection activation request message carrying the connection information about the connection between the RAN and the UE and being adopted to indicate the SM function body to establish the user plane connection for the UE.

In a possible embodiment of the present disclosure, the requesting unit may include: a transmission sub-unit configured to transmit a connection establishment request message to the RAN in accordance with the service request message, the connection establishment request message being adopted to indicate the RAN to establish the connection with the UE; a reception sub-unit configured to receive a connection establishment completion message from the RAN; and an acquisition sub-unit configured to acquire the connection information about the connection between the RAN and the UE in accordance with the connection establishment completion message.

In a possible embodiment of the present disclosure, the requesting module 112 may include a second transmission unit configured to transmit the user plane connection activation request message to the SM function body in accordance with the service request message, the user plane connection activation request message being adopted to indicate the SM function body to request the RAN to establish the connection with the UE, acquire the connection information about the connection between the RAN and the UE, and establish the user plane connection for the UE.

The connection with the UE established by the RAN includes a signaling connection, a user plane connection and/or creation of UE context information.

In a possible embodiment of the present disclosure, the service request message may be initiated by the UE itself or a network.

When the service request message is initiated by the network, the UE idle state processing device may further include: a sixth reception module configured to receive a downlink data notification message from the SM function body, wherein when a downlink data message has been received by a core network, the SM function body searches stored UE context information in accordance with a data message identity corresponding to the downlink data message, when relevant session information has been found, the SM function body transmits the downlink data notification message to the MM function body, otherwise discards the downlink data message, generates and transmits a user plane configuration instruction to an RAN-side UP function body; and a fifth transmission module configured to, upon the receipt of the downlink data notification message, transmit a paging message to the UE, the paging message being adopted to indicate the UE to initiate a service request.

On the basis of the UE idle state processing device in FIG. 10, the UE idle state processing device may further include: a first reception module 81 configured to receive a connection release request message from the RAN; a first transmission module 82 configured to transmit a user plane connection deactivation request message to the SM function body in accordance with the connection release request message, the user plane connection deactivation request message being adopted to indicate the SM function body to modify a user plane path; a second reception module 83 configured to receive a user plane connection deactivation completion message from the SM function body; and a second transmission module 84 configured to, upon the receipt of the user plane connection deactivation completion message, transmit a connection release instruction to the RAN, the connection release instruction being adopted to indicate the RAN to release the connection with the UE.

The connection release request message or the user plane connection deactivation request message may carry at least one of an UE identity, an MM context identity, a base station identity and a release cause.

The connection with the UE released by the RAN may include a signaling connection, a user plane connection and/or deletion of UE context information.

Figure 11:
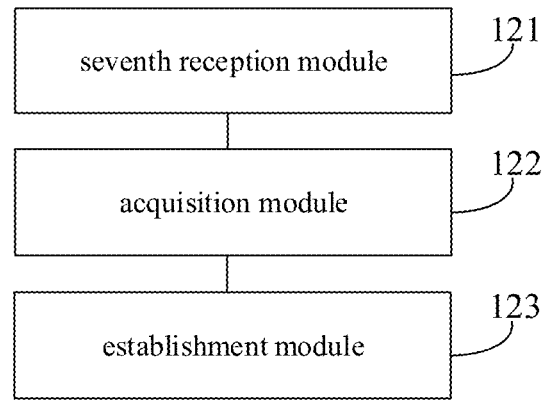
FIG. 11 is still yet another schematic view showing the UE idle state processing device according to the fifth embodiment of the present disclosure.

The present disclosure further provides in this embodiment a UE idle state processing device for use in an SM function body. As shown in FIG. 11, the UE idle state processing device may include: a seventh reception module 121 configured to receive a user plane connection activation request message from an MM function body; an acquisition module 122 configured to acquire connection information about a connection between the RAN and the UE in accordance with the user plane connection activation request message; and an establishment module 123 configured to establish a user plane connection for the UE in accordance with the connection information about the connection between the RAN and the UE and SM-related information.

In this embodiment, the user plane connection activation request message may be transmitted after the MM function body has requested the RAN to establish the connection with the UE in accordance with a service request message received from the UE and forwarded by the RAN, and may carry the connection information about the connection between the RAN and the UE.

In this embodiment, the acquisition module 122 may include: a third transmission unit configured to transmit a connection establishment request message to the RAN in accordance with the user plane connection activation request message, the connection establishment request message being adopted to indicate the RAN to establish the connection with the UE; a first reception unit configured to receive a connection establishment completion message from the RAN; and an acquisition unit configured to acquire the connection information about the connection between the RAN and the UE in accordance with the connection establishment completion message.

In this embodiment, the establishment module 123 may include: a first determination unit configured to determine a user plane path for the UE as unchanged in accordance with the connection information about the connection between the RAN and the UE and the SM-related information; a fourth transmission unit configured to, after the user plane path for the UE has been determined as unchanged, generate and transmit a user plane configuration instruction to an RAN-side UP function body on the user plane path, the user plane configuration instruction being adopted to indicate the RAN-side UP function body to modify a downlink user plane path; and a second reception unit configured to receive a user plane modification completion message from the RAN-side UP function body.

The UE idle state processing device may further include a sixth transmission module configured to transmit a user plane connection completion message to the MM function body.

In this embodiment, the establishment module 123 may include: a second determination unit configured to determine that a new user plane path is reselected for the UE in accordance with the connection information about the connection between the RAN and the UE and the SM-related information; a fifth transmission unit configured to generate and transmit the user plane configuration instruction to a new RAN-side UP function body on the new user plane path, the user plane configuration instruction being adopted to indicate the new RAN-side UP function body to establish a routing or forwarding rule; a sixth transmission unit configured to transmit a user plane modification request message to an original RAN-side UP function body on an original user plane path for the UE, the user plane modification request message being adopted to indicate the original RAN-side UP function body to modify the user plane path; and a third reception unit configured to receive a user plane establishment completion message from the new RAN-side UP function body, and receive a user plane modification completion message from the original RAN-side UP function body.

In this embodiment, the establishment module 123 may include: a third determination unit configured to determine that a new user plane path is reselected for the UE in accordance with the connection information about the connection between the RAN and the UE and the SM-related information; a seventh transmission unit configured to generate and transmit a user plane configuration instruction to a new UP function body and a DN-side UP function body on the new user plane path, the user plane configuration instruction being adopted to indicate the new UP function body to establish a routing or forwarding rule, and indicate the DN-side UP function body to modify the user plane path and forward a data message transmitted to the UE to the new UP function body; and a fourth reception unit configured to receive a user plane establishment completion message from the new UP function body, and receiving a user plane modification completion message from the DN-side UP function body.

The UE idle state processing device may further include: a seventh transmission module configured to generate and transmit a user plane deletion instruction to an original UP function body on an original user plane path for the UE, the user plane deletion instruction being adopted to indicate the original function body to release the user plane connection for the UE; and an eighth reception module configured to receive a user plane deletion completion message from the original UP function body.

The UE idle state processing device may further include: an eighth transmission module configured to generate and transmit a user plane configuration instruction to an original UP function body on an original user plane path for the UE, the user plane configuration instruction being adopted to indicate the original UP function body to establish the user plane path, and forward a received data message to the DN-side UP function body; and a ninth reception module configured to receive a user plane modification completion message from the original UP function body.

The UE idle state processing device may further include: an initiation module configured to initiate a timer, the timer being configured to determine a life cycle of the user plane path established by the original UP function body; a ninth transmission module configured to, when the timer is expired, generate and transmit a user plane deletion instruction to the original UP function body, the user plane deletion instruction being adopted to indicate the original UP function body to release the user plane connection for the UE; and a tenth reception module configured to receive a user plane deletion completion message from the original UP function body.

On the basis of the UE idle state processing device in FIG. 11, the UE idle state processing device may further include: a third reception module 91 configured to receive a user plane connection deactivation request message from the MM function body; a third transmission module 92 configured to generate and transmit a user plane configuration instruction to an RAN-side UP function body in accordance with the user plane connection deactivation request message, the user plane configuration instruction being adopted to indicate the RAN-side UP function body to modify a downlink user plane path; a fourth reception module 93 configured to receive a user plane modification completion message from the RAN-side UP function body; and a fourth transmission module 94 configured to transmit a user plane connection deactivation completion message to the MM function body in accordance with the user plane modification completion message.

The user plane connection deactivation request message may carry at least one of a UE identity, an MM context identity, a base station identity and a release cause.

The connection with the UE released by the RAN may include a signaling connection, a user plane connection and/or deletion of UE context information.

According to the UE idle state processing device in the fifth embodiment of the present disclosure, in the case that an MM function is separated from an SM function, the UE may enter in an idle state through the signaling interaction between the MM function body and the SM function body. When the UE has entered in the idle state, the connection between the RNA and the UE may be released, and the user plane connection in the core network may be maintained, so as to facilitate the rapid response to the service. In addition, the user plane connection may be established for the UE, so as to enable the UE to be switched from the idle state to a connected state, thereby to reduce signaling overhead between a control plane and a user plane, and shorten a time delay for entering the connected state.

Sixth Embodiment

Figure 12:
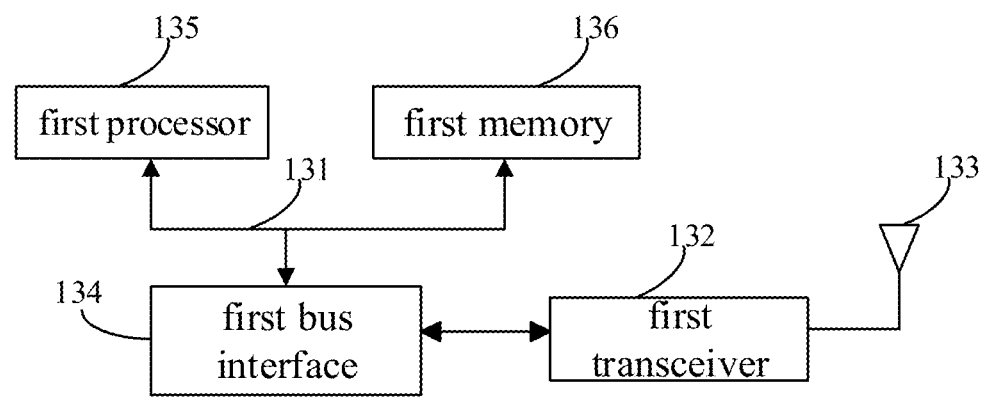
FIG. 12 is a schematic view showing an MM function body according to a sixth embodiment of the present disclosure.

The present disclosure further provides in this embodiment an MM function body which, as shown in FIG. 12, includes a first bus 131, a first transceiver 132, an antenna 133, a first bus interface 134, a first processor 135 and a first memory 136.

The first processor 135 is configured to read a program stored in the first memory 136, so as to receive, through the first transceiver 132, a service request message from a UE forwarded by an RAN, and request an SM function body to establish a user plane connection for the UE in accordance with the service request message.

In addition, the first processor 135 is further configured to: receive, through the first transceiver 132, a connection release request message from the RAN; transmit, through the first transceiver 132, a user plane connection deactivation request message to the SM function body in accordance with the connection release request message, the user plane connection deactivation request message being adopted to indicate the SM function body to modify a user plane path; receive, through the first transceiver 132, a user plane connection deactivation completion message from the SM function body; and upon the receipt of the user plane connection deactivation completion message, transmit, through the first transceiver 132, a connection release instruction to the RAN, the connection release instruction being adopted to indicate the RAN to release the connection with the UE.

The first transceiver 132 is configured to receive and transmit data under the control of the first processor 135.

In FIG. 12, bus architecture (represented by the first bus 131) may include any number of buses and bridges connected to each other, so as to connect various circuits for one or more first processors 135 and one or more first memories 136. In addition, as is known in the art, the first bus 131 may also be used to connect any other circuits, such as a circuit for a peripheral device, a circuit for a voltage stabilizer and a power management circuit, which are not particularly defined herein. The first bus interface 134 may be provided between the first bus 131 and the first transceiver 132, and the first transceiver 132 may consist of one element, or more than one element, e.g., a transmitter and a receiver for communication with any other devices over a transmission medium. Data processed by the first processor 135 may be transmitted on a wireless medium via the first antenna 133. Further, the first antenna 133 may further receive data and transmit the data to the first processor 135.

The first processor 135 may take charge of managing the first bus 131 as well as general processing, and may further provide various functions such as timing, peripheral interfacing, voltage adjustment, power source management and any other control functions. The first memory 136 may store therein data for the operation of the first processor 135. To be specific, the first processor 135 may be a Central Processing Unit (CPU), an Application Specific Integrated Circuit (ASIC), a Field-Programmable Gate Array (FPGA) or a Complex Programmable Logic Device (CPLD).

Seventh Embodiment

Figure 13:
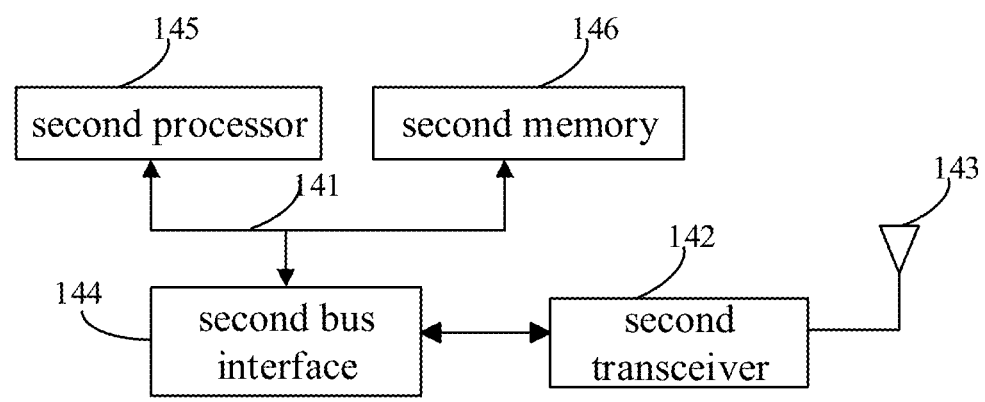
FIG. 13 is a schematic view showing an SM function body according to a seventh embodiment of the present disclosure.

The present disclosure further provides in this embodiment an SM function body which, as shown in FIG. 13, includes a second bus 141, a second transceiver 142, an antenna 143, a second bus interface 144, a second processor 145 and a second memory 146.

The second processor 145 is configured to read a program stored in the second memory 146, so as to: receive, through the second transceiver 142, a user plane connection activation request message from an MM function body; acquire connection information about a connection between the RAN and the UE in accordance with the user plane connection activation request message; and establish a user plane connection for the UE in accordance with the connection information about the connection between the RAN and the UE and SM-related information.

In addition, the second processor 145 is further configured to: receive, through the second transceiver 142, a user plane connection deactivation request message from the MM function body; generate and transmit a user plane configuration instruction to an RAN-side UP function body in accordance with the user plane connection deactivation request message, the user plane configuration instruction being adopted to indicate the RAN-side UP function body to modify a downlink user plane path; receive, through the second transceiver 142, a user plane modification completion message from the RAN-side UP function body; and transmit, through the second transceiver 142, a user plane connection deactivation completion message to the MM function body in accordance with the user plane modification completion message.

The second transceiver 142 is configured to receive and transmit data under the control of the second processor 145.

In FIG. 13, bus architecture (represented by the second bus 141) may include any number of buses and bridges connected to each other, so as to connect various circuits for one or more second processors 145 and one or more second memories 146. In addition, as is known in the art, the second bus 131 may also be used to connect any other circuits, such as a circuit for a peripheral device, a circuit for a voltage stabilizer and a power management circuit, which are not particularly defined herein. The second bus interface 144 may be provided between the second bus 141 and the second transceiver 142, and the second transceiver 142 may consist of one element, or more than one element, e.g., a transmitter and a receiver for communication with any other devices over a transmission medium. Data processed by the second processor 145 may be transmitted on a wireless medium via the second antenna 143. Further, the second antenna 143 may further receive data and transmit the data to the second processor 145.

The second processor 145 may take charge of managing the second bus 141 as well as general processing, and may further provide various functions such as timing, peripheral interfacing, voltage adjustment, power source management and any other control functions. The second memory 146 may store therein data for the operation of the second processor 135. To be specific, the second processor 145 may be a CPU, an ASIC, an FPGA or a CPLD.

Although the present disclosure and its advantages have been described hereinabove, it should be appreciated that, various modifications, substitutions and alternations may be further made without departing from the spirit and scope defined by the appended claims. Such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

The serial numbers of the embodiments are for illustrative purposes only, but shall not be used to define that one embodiment is superior to the other.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., Read-Only Memory (ROM)/Random Access Memory (RAM), magnetic disk or optical disk) and include several instructions so as to enable a terminal device (mobile phone, computer, server, air conditioner or network device) to execute the method in the embodiments of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A User Equipment (UE) idle state processing method for use in a Mobility Management (MM) function body, comprising:
   receiving a service request message from a UE forwarded by a Radio Access Network (RAN); and
   requesting a Session Management (SM) function body to establish a user plane connection for the UE in accordance with the service request message;
   wherein the requesting the SM function body to establish the user plane connection for the UE in accordance with the service request message comprises:
      requesting the RAN to establish a connection with the UE and acquire connection information about the connection between the RAN and the UE in accordance with the service request message; and
      transmitting a user plane connection activation request message to the SM function body, the user plane connection activation request message carrying the connection information about the connection between the RAN and the UE and being used to indicate the SM function body to establish the user plane connection for the UE,
      wherein the connection with the UE established by the RAN comprises a signaling connection, a user plane connection and/or creation of UE context information.

2. The UE idle state processing method according to claim 1, wherein the requesting the RAN to establish the connection with the UE and acquire the connection information about the connection between the RAN the UE in accordance with the service request message comprises:
   transmitting a connection establishment request message to the RAN in accordance with the service request message, the connection establishment request message being used to indicate the RAN to establish the connection with the UE;
   receiving a connection establishment completion message from the RAN; and
   acquiring the connection information about the connection between the RAN and the UE in accordance with the connection establishment completion message.

3. The UE idle state processing method according to claim 1, wherein the requesting the SM function body to establish the user plane connection for the UE in accordance with the service request message comprises:
   transmitting the user plane connection activation request message to the SM function body in accordance with the service request message,
   wherein the user plane connection activation request message is used to indicate the SM function body to request the RAN to establish the connection with the UE, acquire the connection information about the connection between the RAN and the UE, and establish the user plane connection for the UE.

4. The UE idle state processing method according to claim 1, wherein the service request message is initiated by the UE itself or a network.

5. The UE idle state processing method according to claim 4, wherein when the service request message is initiated by the network, prior to receiving the service request message from the UE forwarded by the RAN, the UE idle state processing method further comprises:
   receiving a downlink data notification message from the SM function body, wherein when a downlink data message has been received by a core network, the SM function body searches stored UE context information in accordance with a data message identity corresponding to the downlink data message, when relevant session information has been found, transmits the downlink data notification message to the MM function body, otherwise discards the downlink data message, generates and transmits a user plane configuration instruction to an RAN-side UP function body; and
   upon the receipt of the downlink data notification message, transmitting a paging message to the UE, the paging message being used to indicate the UE to initiate a service request.

6. The UE idle state processing method according to claim 1, further comprising:
   receiving a connection release request message from the RAN;
   transmitting a user plane connection deactivation request message to the SM function body in accordance with the connection release request message, the user plane connection deactivation request message being used to indicate the SM function body to modify a user plane path;
   receiving a user plane connection deactivation completion message from the SM function body; and
   upon the receipt of the user plane connection deactivation completion message, transmitting a connection release instruction to the RAN, the connection release instruction being used to indicate the RAN to release the connection with the UE,
   wherein the connection release request message or the user plane connection deactivation request message carries at least one of an UE identity, an MM context identity, a base station identity or a release cause,
   wherein the connection with the UE released by the RAN comprises a signaling connection, a user plane connection and/or deletion of UE context information.

7. A UE idle state processing method for use in an SM function body, comprising:
   receiving a user plane connection activation request message from an MM function body;
   acquiring connection information about a connection between the RAN and the UE in accordance with the user plane connection activation request message; and
   establishing a user plane connection for the UE in accordance with the connection information about the connection between the RAN and the UE and SM-related information;
   wherein the user plane connection activation request message is transmitted after the MM function body has requested the RAN to establish the connection with the UE in accordance with a service request message received from the UE and forwarded by the RAN, and carries the connection information about the connection between the RAN and the UE.

8. The UE idle state processing method according to claim 7, wherein the acquiring the connection information about the connection between the RAN and the UE in accordance with the user plane connection activation request message comprises:
   transmitting a connection establishment request message to the RAN in accordance with the user plane connection activation request message, the connection establishment request message being used to indicate the RAN to establish the connection with the UE;

receiving a connection establishment completion message from the RAN; and acquiring the connection information about the connection between the RAN and the UE in accordance with the connection establishment completion message.

9. The UE idle state processing method according to claim 7, wherein the establishing the user plane connection for the UE in accordance with the connection information about the connection between the RAN and the UE and the SM-related information comprises:

determining a user plane path for the UE as unchanged in accordance with the connection information about the connection between the RAN and the UE and the SM-related information;

after the user plane path for the UE has been determined as unchanged, generating and transmitting a user plane configuration instruction to an RAN-side UP function body on the user plane path, the user plane configuration instruction being used to indicate the RAN-side UP function body to modify a downlink user plane path; and receiving a user plane modification completion message from the RAN-side UP function body.

10. The UE idle state processing method according to claim 9, wherein subsequent to receiving the user plane modification completion message from the RAN-side UP function body, the UE idle state processing method further comprises transmitting a user plane connection completion message to the MM function body.

11. The UE idle state processing method according to claim 7, wherein the establishing the user plane connection for the UE in accordance with the connection information about the connection between the RAN and the UE and the SM-related information comprises:

determining that a new user plane path is reselected for the UE in accordance with the connection information about the connection between the RAN and the UE and the SM-related information;

generating and transmitting the user plane configuration instruction to a new RAN-side UP function body on the new user plane path, the user plane configuration instruction being used to indicate the new RAN-side UP function body to establish a routing or forwarding rule;

transmitting a user plane modification request message to an original RAN-side UP function body on an original user plane path for the UE, the user plane modification request message being used to indicate the original RAN-side UP function body to modify the user plane path; and receiving a user plane establishment completion message from the new RAN-side UP function body, and receiving a user plane modification completion message from the original RAN-side UP function body.

12. The UE idle state processing method according to claim 7, wherein the establishing the user plane connection for the UE in accordance with the connection information about the connection between the RAN and the UE and the SM-related information comprises:

determining that a new user plane path is reselected for the UE in accordance with the connection information about the connection between the RAN and the UE and the SM-related information;

generating and transmitting a user plane configuration instruction to a new UP function body and a DN-side UP function body on the new user plane path, the user plane configuration instruction being used to indicate the new UP function body to establish a routing or forwarding rule, and indicate the DN-side UP function body to modify the user plane path and forward a data message transmitted to the UE to the new UP function body; and receiving a user plane establishment completion message from the new UP function body, and receiving a user plane modification completion message from the DN-side UP function body.

13. The UE idle state processing method according to claim 12, wherein subsequent to receiving the user plane establishment completion message from the new UP function body and receiving the user plane modification completion message from the DN-side UP function body, the UE idle state processing method further comprises:

generating and transmitting a user plane deletion instruction to an original UP function body on an original user plane path for the UE, the user plane deletion instruction being used to indicate the original UP function body to release the user plane connection for the UE; and receiving a user plane deletion completion message from the original UP function body.

14. The UE idle state processing method according to claim 12, wherein subsequent to receiving the user plane establishment completion message from the new UP function body and receiving the user plane modification completion message from the DN-side UP function body, the UE idle state processing method further comprises:

generating and transmitting a user plane configuration instruction to an original UP function body on an original user plane path for the UE, the user plane configuration instruction being used to indicate the original UP function body to establish the user plane path, and forward a received data message to the DN-side UP function body; and receiving a user plane modification completion message from the original UP function body.

15. The UE idle state processing method according to claim 14, wherein subsequent to receiving the user plane modification completion message from the original UP function body, the UE idle state processing method further comprises:

initiating a timer, the timer being configured to determine a life cycle of the user plane path established by the original UP function body;

when the timer is expired, generating and transmitting a user plane deletion instruction to the original UP function body, the user plane deletion instruction being used to indicate the original UP function body to release the user plane connection for the UE; and receiving a user plane deletion completion message from the original UP function body.

16. The UE idle state processing method according to claim 7, further comprising:

receiving a user plane connection deactivation request message from the MM function body;

generating and transmitting a user plane configuration instruction to an RAN-side UP function body in accordance with the user plane connection deactivation request message, the user plane configuration instruction being used to indicate the RAN-side UP function body to modify a downlink user plane path;

receiving a user plane modification completion message from the RAN-side UP function body; and transmitting a user plane connection deactivation completion message to the MM function body in accordance with the user plane modification completion message, wherein the user plane connection deactivation request message carries at least one of a UE identity, an MM context identity, a base station identity or a release cause, wherein the connection with the UE released by the RAN comprises a signaling connection, a user plane connection and/or deletion of UE context information.

17. A User Equipment (UE) idle state processing device for use in a Mobility Management (MM) function body, comprising a processor, a memory, and a computer program stored in the memory and executed by the processor, wherein the computer program is executed by the processor, the processor implements a UE idle state processing method for use in the MM function body, comprising:

receiving a service request message from a UE forwarded by a Radio Access Network (RAN); and requesting a Session Management (SM) function body to establish a user plane connection for the UE in accordance with the service request message;

wherein the requesting the SM function body to establish the user plane connection for the UE in accordance with the service request message comprises:

requesting the RAN to establish a connection with the UE and acquire connection information about the connection between the RAN and the UE in accordance with the service request message; and transmitting a user plane connection activation request message to the SM function body, the user plane connection activation request message carrying the connection information about the connection between the RAN and the UE and being used to indicate the SM function body to establish the user plane connection for the UE, wherein the connection with the UE established by the RAN comprises a signaling connection, a user plane connection and/or creation of UE context information.

* * * * *